(12) United States Patent
Takeda et al.

(10) Patent No.: US 10,797,837 B2
(45) Date of Patent: Oct. 6, 2020

(54) USER TERMINAL, RADIO BASE STATION AND RADIO COMMUNICATION METHOD

(71) Applicant: NTT DOCOMO, INC., Tokyo (JP)

(72) Inventors: Kazuki Takeda, Tokyo (JP); Hiroki Harada, Tokyo (JP); Yoshihisa Kishiyama, Tokyo (JP); Satoshi Nagata, Tokyo (JP); Yousuke Sano, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 30 days.

(21) Appl. No.: 16/087,809

(22) PCT Filed: Mar. 22, 2017

(86) PCT No.: PCT/JP2017/011387
§ 371 (c)(1),
(2) Date: Sep. 24, 2018

(87) PCT Pub. No.: WO2017/164221
PCT Pub. Date: Sep. 28, 2017

(65) Prior Publication Data
US 2019/0109687 A1 Apr. 11, 2019

(30) Foreign Application Priority Data
Mar. 25, 2016 (JP) ................. 2016-061784

(51) Int. Cl.
*H04B 7/06* (2006.01)
*H04L 5/00* (2006.01)
(Continued)

(52) U.S. Cl.
CPC .......... *H04L 5/0048* (2013.01); *H01Q 21/06* (2013.01); *H04B 7/06* (2013.01); *H04B 7/08* (2013.01);
(Continued)

(58) Field of Classification Search
CPC ........ H04L 5/0048; H01Q 21/06; H04B 7/06; H04B 7/08; H04W 16/28; H04W 24/10; H04W 72/048
See application file for complete search history.

(56) References Cited

U.S. PATENT DOCUMENTS

2013/0045690 A1 2/2013 Seol et al.
2013/0182683 A1 7/2013 Seol et al.
(Continued)

FOREIGN PATENT DOCUMENTS

JP 2010-074571 A 4/2010
JP 2014-204200 A 10/2014

OTHER PUBLICATIONS

International Search Report issued in PCT/JP2017/011387 dated May 30, 2017 (1 page).
(Continued)

*Primary Examiner* — Melvin C Marcelo
(74) *Attorney, Agent, or Firm* — Osha Liang LLP

(57) ABSTRACT

The present invention is designed to reduce the time it takes to form adequate beams, in communication using beamforming. According to one aspect of the present invention, a user terminal has a transmission section that, using temporally orthogonal radio resources, forms different transmitting beams and transmits reference signals respectively to a radio base station, and a control section that controls the forming of the transmitting beams so that at least one of the reference signals is received in a receiving beam which the radio base station forms in a given period set.

6 Claims, 18 Drawing Sheets

(51) Int. Cl.
 *H04W 16/28* (2009.01)
 *H01Q 21/06* (2006.01)
 *H04B 7/08* (2006.01)
 *H04W 24/10* (2009.01)
 *H04W 72/04* (2009.01)

(52) U.S. Cl.
 CPC ............ *H04W 16/28* (2013.01); *H04W 24/10* (2013.01); *H04W 72/048* (2013.01)

(56) References Cited

U.S. PATENT DOCUMENTS

2013/0223251 A1 8/2013 Li et al.
2013/0322280 A1* 12/2013 Pi .................... H04W 72/0413
 370/252
2014/0198696 A1 7/2014 Li et al.

OTHER PUBLICATIONS

Written Opinion of the International Searching Authority issued in PCT/JP2017/011387 dated May 30, 2017 (4 pages).

Ma, Y. et al.; "Experimental evaluation of beamforming and throughput performance using lens antenna in downlink for 5G mmW Radio Access in an electromagnetic shield room"; Proceedings of the 2015 IEICE General Conference Tsushin 1, Feb. 24, 2015, p. 453 (1 page).

3GPP TS 36.300 V124.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)"; Dec. 2014 (251 pages).

Extended European Search Report issued in the counterpart European Patent Application No. 17770261.0, dated Oct. 31, 2019 (10 pages).

* cited by examiner

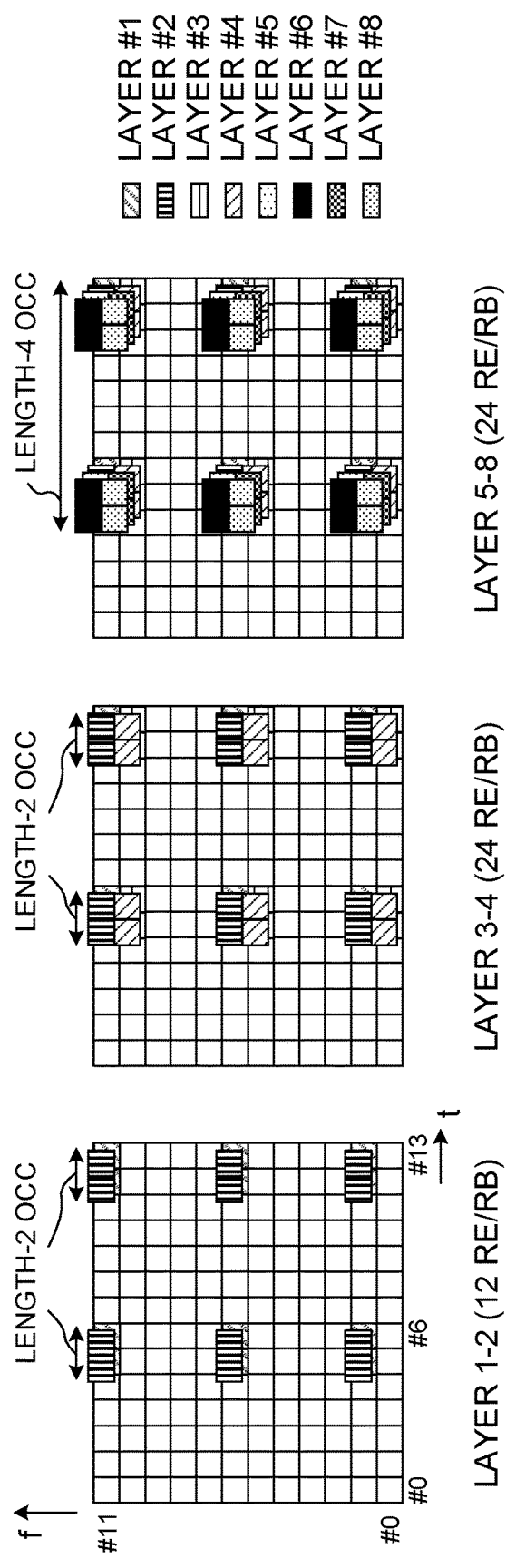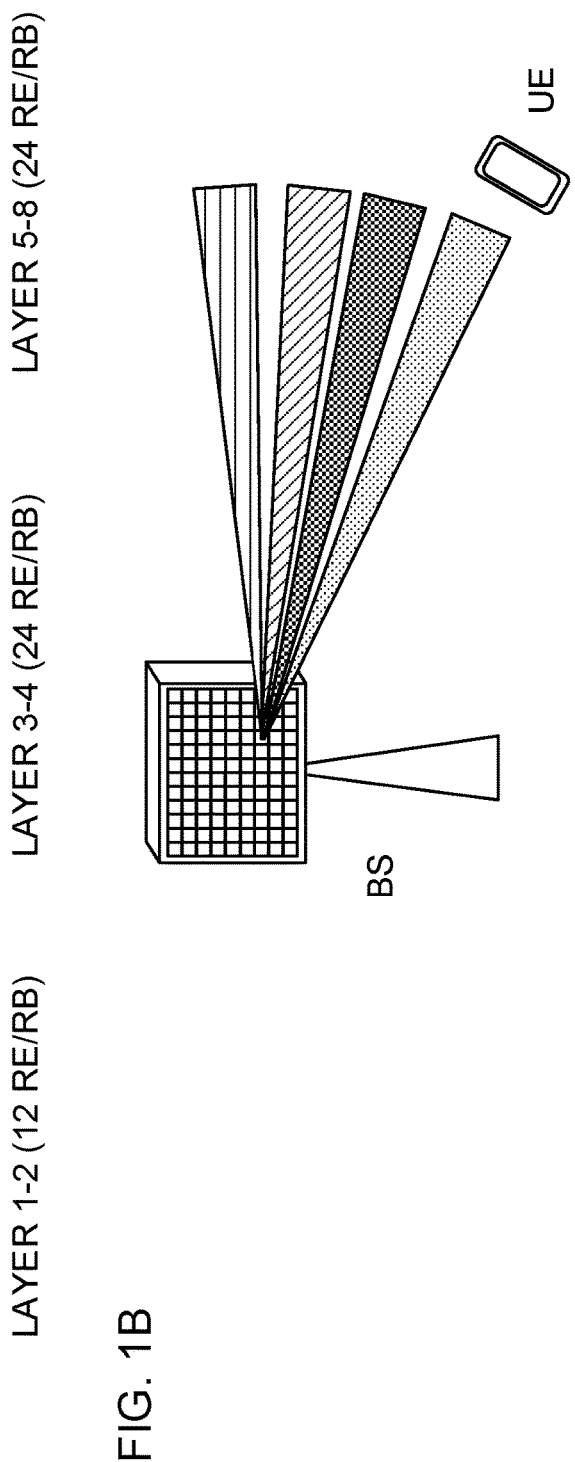
FIG. 1A
FIG. 1B

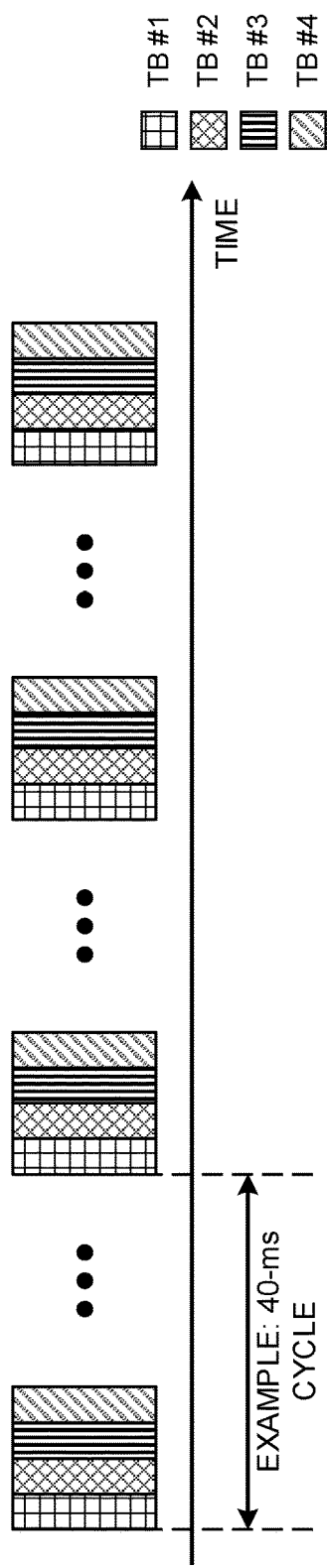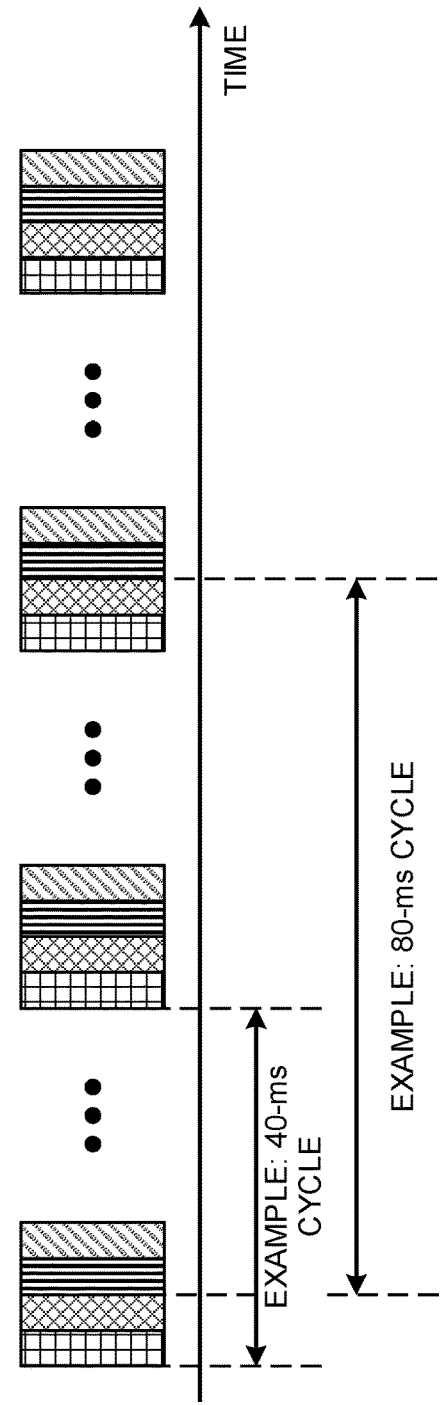
FIG. 4A
FIG. 4B

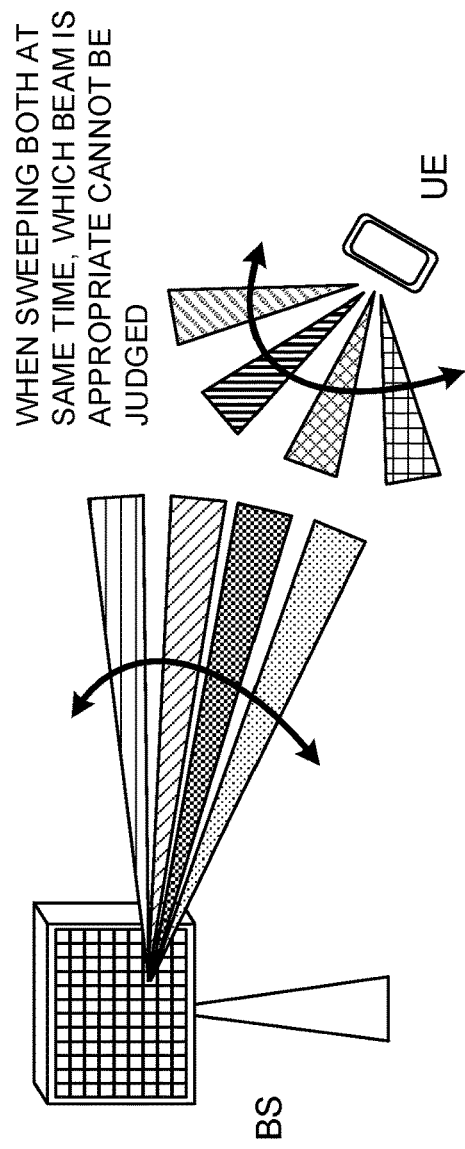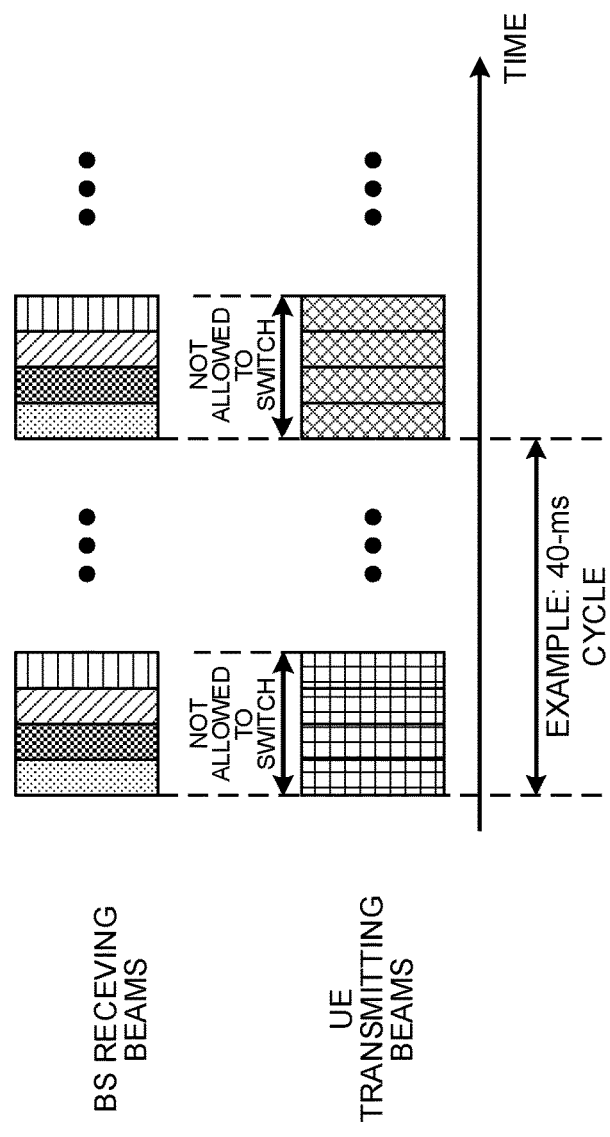
FIG. 9A
FIG. 9B

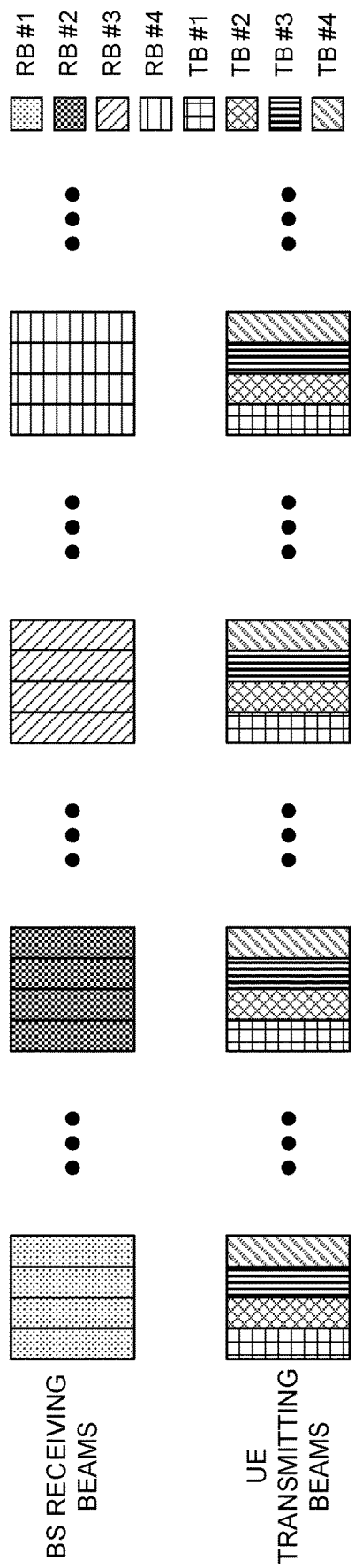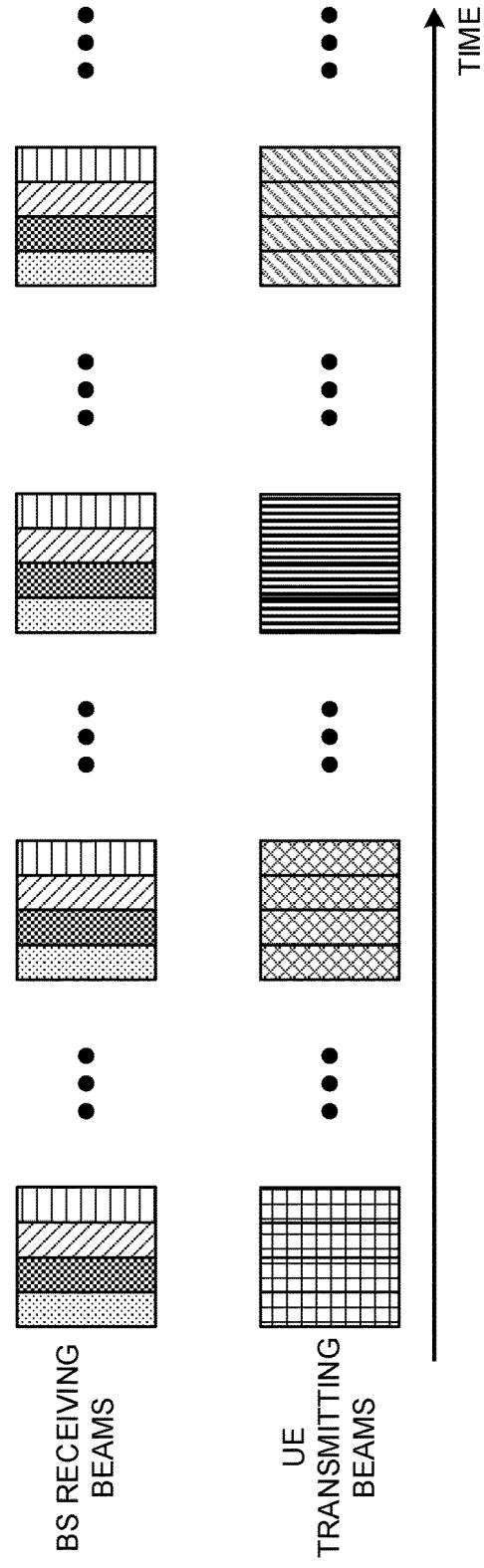

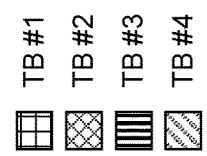
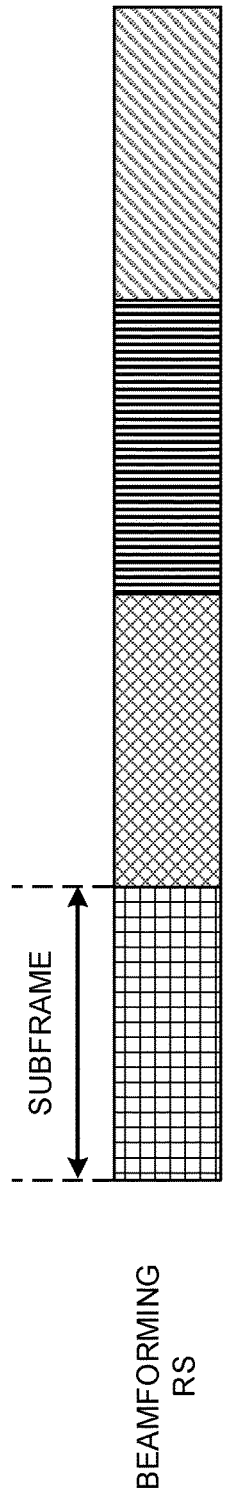
FIG. 12A
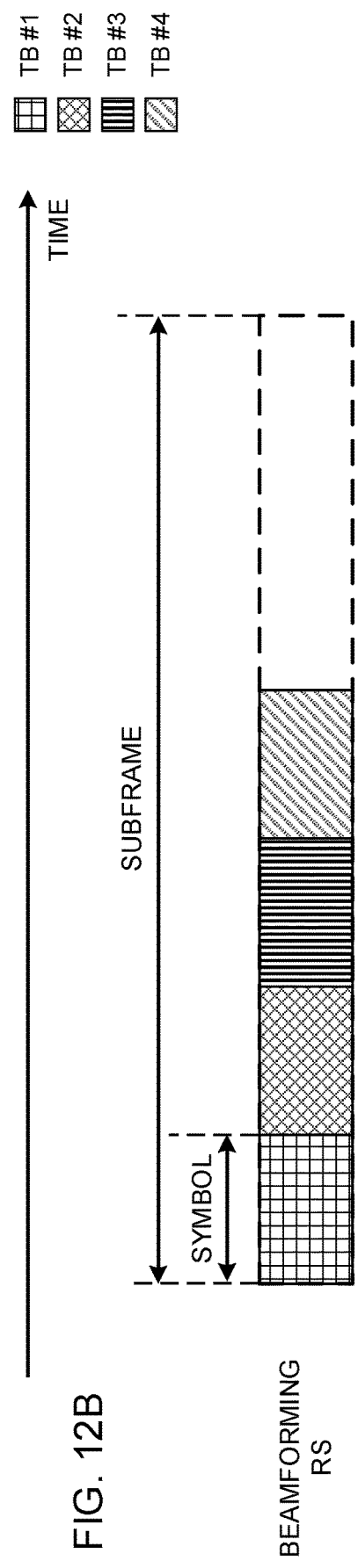
FIG. 12B
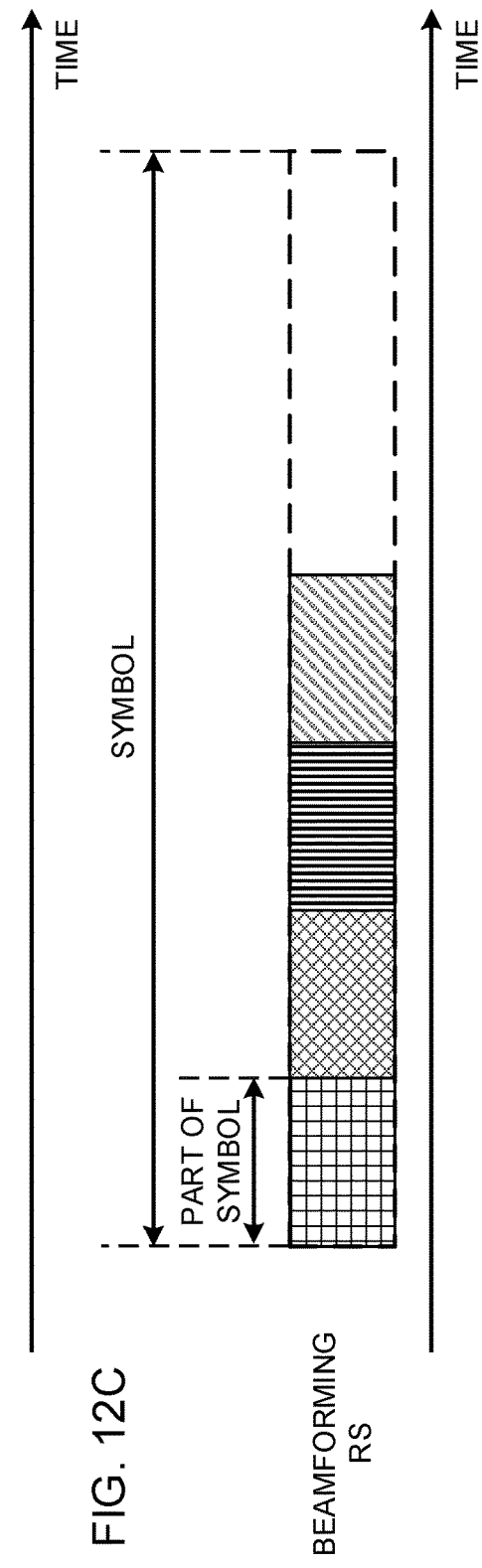
FIG. 12C

USER TERMINAL, RADIO BASE STATION AND RADIO COMMUNICATION METHOD

TECHNICAL FIELD

The present invention relates to a user terminal, a radio base station and a radio communication method in a next-generation mobile communication system.

BACKGROUND ART

In the UMTS (Universal Mobile Telecommunications System) network, the specifications of long term evolution (LTE) have been drafted for the purpose of further increasing high speed data rates, providing lower latency and so on (see non-patent literature 1). Also, the specifications of LTE-A (also referred to as "LTE-Advanced," "LTE Rel. 10," "Rel. 11," or "Rel. 12," etc.) have been drafted for further broadbandization and increased speed beyond LTE (also referred to as "LTE Rel. 8" or "Rel. 9"), and successor systems of LTE (also referred to as, for example, "FRA (Future Radio Access)," "5G (5th generation mobile communication system)," "LTE Rel. 13/14/15," and/or later versions) are under study.

In LTE Rel. 10/11, carrier aggregation (CA) to integrate multiple component carriers (CC) is introduced in order to achieve broadbandization. Each CC is configured with the system bandwidth of LTE Rel. 8 as one unit. In addition, in CA, multiple CCs under the same radio base station (eNB: eNodeB) are configured in a user terminal (UE: User Equipment).

Meanwhile, in LTE Rel. 12, dual connectivity (DC), in which multiple cell groups (CGs) formed by different radio base stations are configured in a UE, is also introduced. Each cell group is comprised of at least one cell (CC). Since multiple CCs of different radio base stations are integrated in DC, DC is also referred to as "inter-eNB CA."

Also, in LTE Rel. 8 to 12, frequency division duplex (FDD), in which downlink (DL) transmission and uplink (UL) transmission are made in different frequency bands, and time division duplex (TDD), in which downlink transmission and uplink transmission are switched over time and made in the same frequency band, are introduced.

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall description; Stage 2"

SUMMARY OF INVENTION

Technical Problem

Future radio communication systems (for example, 5G) are expected to realize various radio communication services so as to fulfill mutually different requirements (for example, ultra-high speed, large capacity, ultra-low latency, etc.).

For example, in 5G, researches have been made to provide radio communication services, referred to as "eMBB (enhanced Mobile Broad Band)," "IoT (Internet of Things)," "MTC (Machine Type Communication)," "M2M (Machine To Machine)," and "URLLC (Ultra Reliable and Low Latency Communications)."

Note that M2M may be referred to as "D2D (Device To Device)," "V2V (Vehicular To Vehicular)," etc. depending on the communication device. To fulfill the requirements for various types of communication such as mentioned above, studies are in progress to design new communication access schemes (new RAT (Radio Access Technology).

For example, to meet the demands for the above-noted various types of communication, there is an on-going study to use massive MIMO (Multiple Input Multiple Output), which uses a very large number of antenna elements. When a very large number of antenna elements are used, beams (antenna directivities) can be formed by controlling the amplitude and/or the phase of signals transmitted/received in each element. This process is also referred to as "beamforming (BF)," and makes it possible to reduce the propagation loss of radio waves.

However, when communication is carried out using BF in both the transmitting device and the receiving device, depending on the structure of each device, it may take a long time to form adequate beams.

The present invention has been made in view of the above, and it is therefore an object of the present invention to provide a user terminal, a radio base station and a radio communication method, whereby the time it takes to form adequate beams in communication using beamforming can be reduced.

Solution to Problem

According to one aspect of the present invention, a user terminal has a transmission section that, using temporally orthogonal radio resources, forms different transmitting beams and transmits reference signals respectively to a radio base station, and a control section that controls the forming of the transmitting beams so that at least one of the reference signals is received in a receiving beam which the radio base station forms in a given period set.

Advantageous Effects of Invention

According to the present invention, it is possible to reduce the time it takes to form adequate beams in communication using beamforming.

BRIEF DESCRIPTION OF DRAWINGS

FIGS. 1A and 1B are diagrams to show examples of MIMO precoding in conventional LTE;

FIGS. 4A and 4B are diagrams to show examples of transmission patterns of beamforming RSs;

FIGS. 9A and 9B are diagrams to explain the problems and solutions when a BS scans receiving beams;

FIGS. 10A and 10B are diagrams to show examples of adequate beam scanning by a UE and a BS;

FIGS. 12A to 12C are diagrams to show examples of transmission time durations of beamforming RSs (time durations of UE transmitting beams);

DESCRIPTION OF EMBODIMENTS

BF can be classified into digital BF and analog BF. Digital BF refers to the method of performing precoding signal processing on the baseband (for digital signals). In this case, inverse fast Fourier transform (IFFT)/digital-to-analog conversion (DAC)/RF (Radio Frequency) need to be carried out in parallel processes, as many as the number of antenna ports (RF chains). Meanwhile, it is possible to form a number of beams to match the number of RF chains at an arbitrary timing.

Analog BF refers to the method of using phase shifters on RF. In this case, it suffices to only rotate the phase of RF signals, so that this method can be implemented easily and inexpensively. However, there is a problem that a plurality of beams cannot be formed at the same time.

Note that it is also possible to adopt a hybrid BF configuration, which combines digital BF and analog BF.

MIMO precoding in conventional LTE is oblivious to (does not take into consideration) analog BF, and is premised on digital BF. FIG. 1 provide diagrams to show examples of MIMO precoding in conventional LTE. FIG. 1A shows an example of the format of a demodulation reference signal (DMRS: DeModulation Reference Signal) for receiving the PDSCH.

As shown in FIG. 1A, in conventional LTE, in one-layer communication to four-layer communication, two DMRSs are multiplexed over one resource element (RE), and in five-layer communication to eight-layer communication, four DMRSs are multiplexed over one RE. That is, in conventional LTE, signals are arranged based on the assumption that DMRSs that are mapped on different beams are multiplexed on the same RE.

For example, when DMRS of four different beams are multiplexed on the same RE, as shown in FIG. 1B, a radio base station (also referred to as an "eNB (evolved Node B)," a "BS (Base Station)," etc.) can transmit a plurality of beams at the same time by using digital BF.

Figure 2:
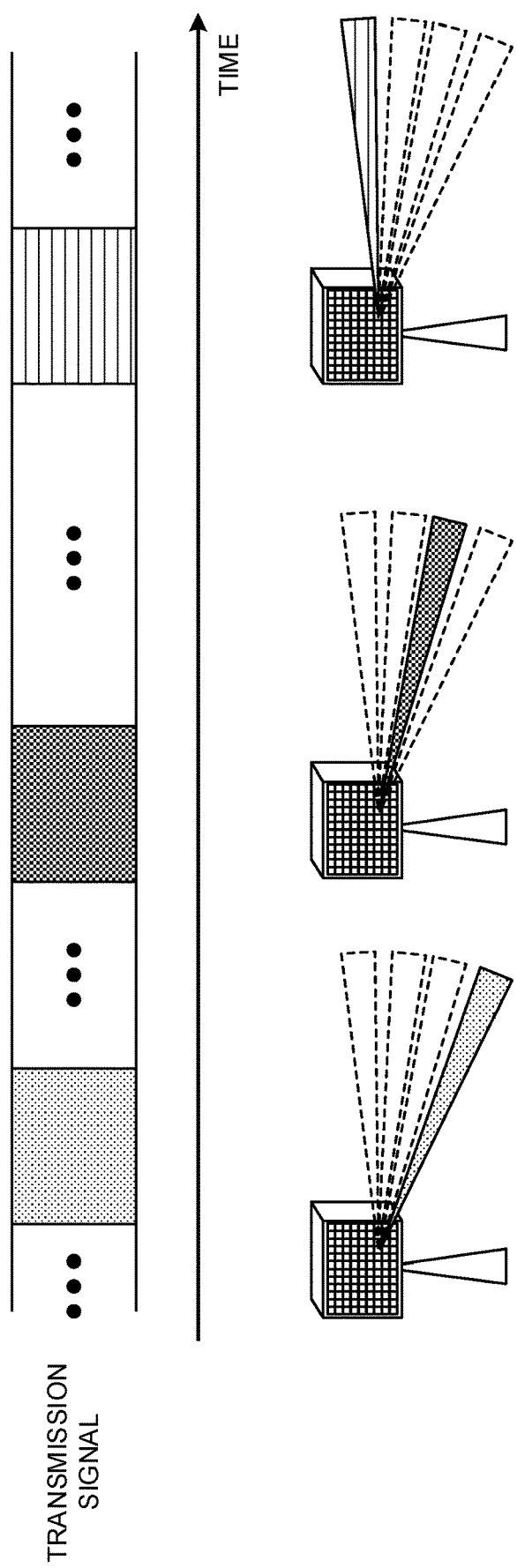
FIG. 2 is a diagram to explain the limitations of beamforming based on analog BF.

On the other hand, when analog BF is used, unlike digital BF, limitations are placed on the forming of beams. FIG. 2 is a diagram to explain the limitations of beamforming when using analog BF. When analog BF is used, for each phase shifter, only one beam can be formed at a time. Thus, if a BS has only one phase shifter, the BS has to form only one beam, at any given time, as shown in FIG. 2. Therefore, when analog BF is used, the beams need to be switched over time, rotated, and so on.

While a study is on-going to introduce massive MIMO in future radio communication systems (for example, 5G), attempting to form an enormous number of beams with digital BF alone might lead to an expensive circuit structure. For this reason, it is assumed that a hybrid BF configuration will be used in 5G.

Regardless of analog BF or digital BF, massive MIMO can provide good BF gain only if adequate beams can be formed. Meanwhile, as mentioned earlier, the process of beamforming is different between analog BF and digital BF, it is necessary to introduce control that realizes adequate beamforming, in each type of BF.

However, since analog BF has not been taken into account in conventional LTE, there is no established method of determining adequate beams efficiently, even under 5G environment. So, there is a possibility of spending a long time to form adequate beams and/or communicating using inadequate beams.

So, the present inventors have focused on analog BF, which imposes significant limitations on beamforming, and found out a beam control method that is suitable for analog BF. Note that this control method can be applied to digital BF on an as-is basis, and can also be extended to analog-digital hybrid BF.

This specification proposes a method for adequately forming beams for use in uplink communication (receiving beams in a BS and/or transmitting beams in a user terminal (UE: User Equipment).

Now, embodiments of the present invention will be described in detail below with reference to the accompanying drawings. The radio communication methods according to individual embodiments may be applied individually or may be applied in combination.

Note that, when a plurality of beams are different, this should be construed to mean that, for example, at least one of following (1) to (6), which are applied to each of these multiple beams, is different, but this is not limiting: (1) the precoding; (2) the transmission power; (3) the phase rotation; (4) the beam width; (5) the beam angle (for example, the tilt angle); and (6) the number of layers. Note that, when the precoding varies, the precoding weight may vary, or the precoding scheme may vary (for example, linear precoding, non-linear precoding and so on). When linear precoding and non-linear precoding are applied to beams, the transmission power, the phase rotation, the number of layers and so on can also vary.

Examples of linear precoding include precoding based on the zero-forcing (ZF) model, precoding based on the regularized zero-forcing (R-ZF) model, precoding based on the minimum mean square error (MMSE) model, and so on. Also, as for examples of non-linear precoding, there are types of precoding, including dirty paper coding (DPC), vector perturbation (VP), Tomlinson-Harashima precoding (THP), and so on. The applicable precoding is not limited to these.

In addition, although cases will be described with the following embodiments where four of RB #1 to RB #4 are used as receiving beams (RBs) at a BS, and four of TB #1 to TB #4 are used as transmitting beams (TBs) at a UE, this is by no means limiting. For example, the orientation, the length, the number and other properties of beams to apply are not limited to the examples illustrated below.

Also, although, in the following description of embodiments, beams can be switched at a BS and a UE without delay, the BS and/or the UE can perform various processes on the assumption that a certain delay is produced when beams are switched.

(Radio Communication Method)

According to one embodiment of the present invention, adequate beams are determined using reference signals (RS) that are provided on a per beam basis. These reference signals may be referred to as "beamforming RSs (BFRSs)," "beam-specific RSs" and so on. Because beamforming for uplink communication will be described in this specification, uplink beamforming RSs will be simply referred to as "beamforming RSs."

<Transmitting-Beam Scanning in UE>

Figure 3A:
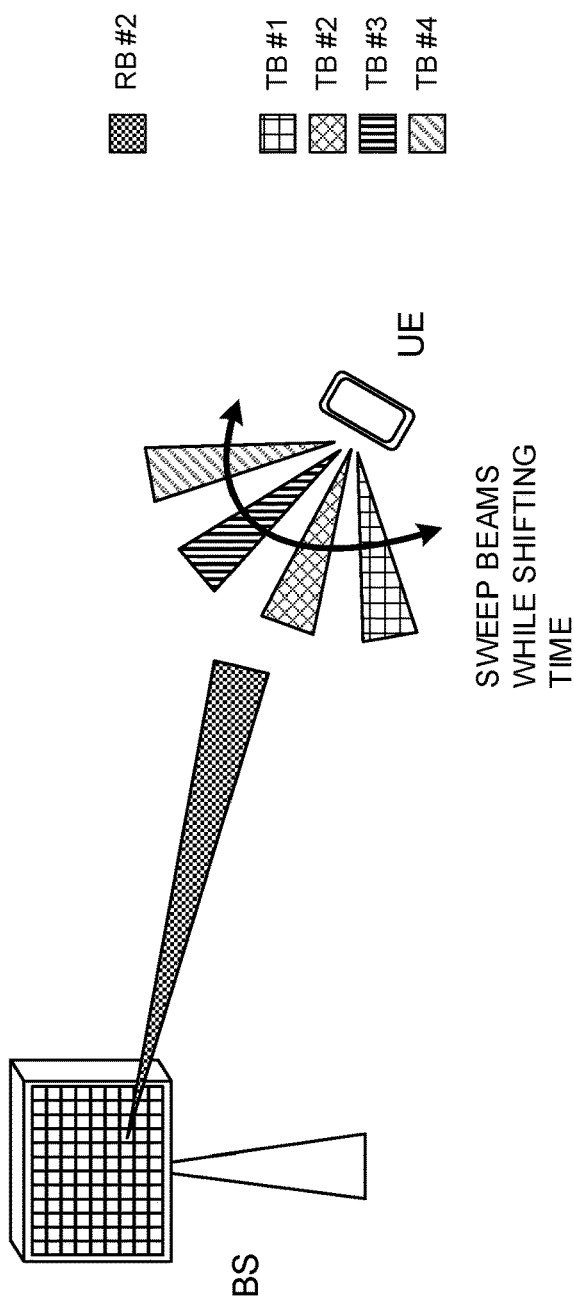
FIGS. 3A and 3B are diagrams to explain the concept of transmitting-beam scanning when beamforming RSs are used.
Figure 3B:
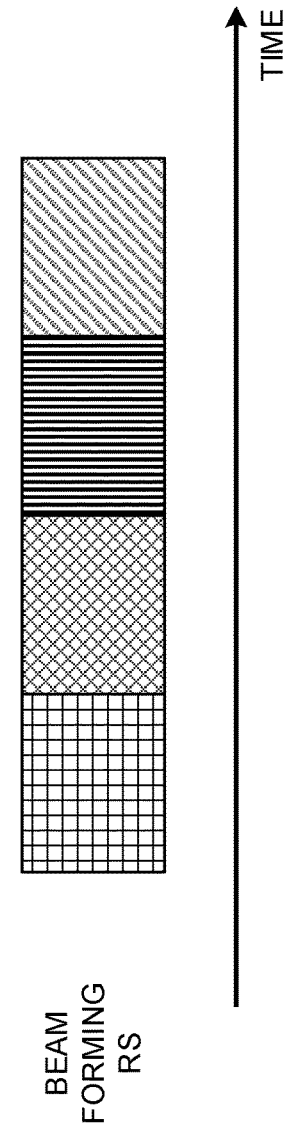

FIG. 3 provide diagrams to explain the concept of transmitting-beam scanning when beamforming RSs are used. FIG. 3A shows examples of UE transmitting beams, corresponding to multiple beamforming RSs, respectively. FIG. 3B shows examples of time resources for beamforming RSs, in accordance with FIG. 3A. In FIG. 3, a UE applies different transmission beamforming to beamforming RSs at different times.

In the examples shown in FIG. 3, the UE sweeps (scans) the transmitting beams from TB #1 to TB #4 while shifting in time. In this way, by adopting a structure in which beamforming RSs are formed with radio resources that are temporally orthogonal, even when analog BF is used, it is possible to transmit beamforming RSs adequately.

Meanwhile, the BS measures the received quality using each beamforming RS. Here, the received quality to be measured may be, for example, long-term received quality (such as reference signal received power (RSRP)), short-term received quality (such as channel state information (CSI)) and so on, but these are by no means limiting.

Also, based on the measured received quality of each beamforming RS, the BS can determine which beam is suitable for the UE, and use this for subsequent communication with the UE.

Using higher layer signaling (for example, RRC (Radio Resource Control) signaling, broadcast information (MIB (Master Information Block), SIBs (System Information Blocks), etc.), physical layer signaling (for example, DCI), or a combination of these, the BS can report information about the beamforming RSs which the UE should transmit separately. For example, as information related to a beamforming RS, the BS can report information of at least one of the number of RSs, the transmission timing (the receiving timing), the transmission cycle (the measurement cycle), the transmission time duration (the duration of RS transmission in each cycle), and the radio resources (for example, frequency and/or time resources), to the UE (configured in the UE). The information regarding the transmission timing and so on may be reported using a bitmap.

In addition, the BS may report information about UE transmitting beams, selected based on the measurement results of the beamforming RSs, to the UE, using higher layer signaling, physical layer signaling, or a combination of these. The information related to transmitting beams may be beam indices (beam control indices), which can specify the beams. Receiving this information, the UE can decide the transmitting beams to use in subsequent communication, based on this information.

FIG. 4 provide diagrams to show examples of transmission patterns for beamforming RSs. FIG. 4A shows an example, in which each beamforming RS is transmitted in the same cycle (which is, for example, 40 ms). By transmitting each RS in the same cycle, the BS can have an equal opportunity to receive each beam.

FIG. 4 show examples in which different beamforming RSs are transmitted continuously in time. In this manner, it is possible to allow the UE to transmit beamforming RSs substantially at the same time, so that the UE can finish transmitting beamforming RSs in a short time, and save the battery consumption of the UE.

Alternatively, the beamforming RSs may be distributed over time and transmitted (not shown). In this case, the cycle the BS measures a given beamforming RS can be shortened, so that, even when the UE is moving at a high speed, communication can be carried out more easily using any of the beams.

The transmission timing, the transmission cycle and so on may be changed individually for each beamforming RS. It is preferable that these can be changed individually, when, for example, the width of each beam varies. In the example shown in FIG. 4B, the RSs corresponding to TBs #1 and #2 are transmitted in a first cycle (which is, for example, 40 ms), and the RSs corresponding to TBs #3 and #4 are transmitted in a second cycle (which is, for example, 80 ms).

For example, by making the transmission cycle (measurement cycle) of the beamforming RS for beam Z (Z≠X), which the UE presently communicating using beam X is little likely to use next, it is possible to reduce the overhead pertaining to RS transmission, while lessening the negative impact on beam control.

Figure 5:
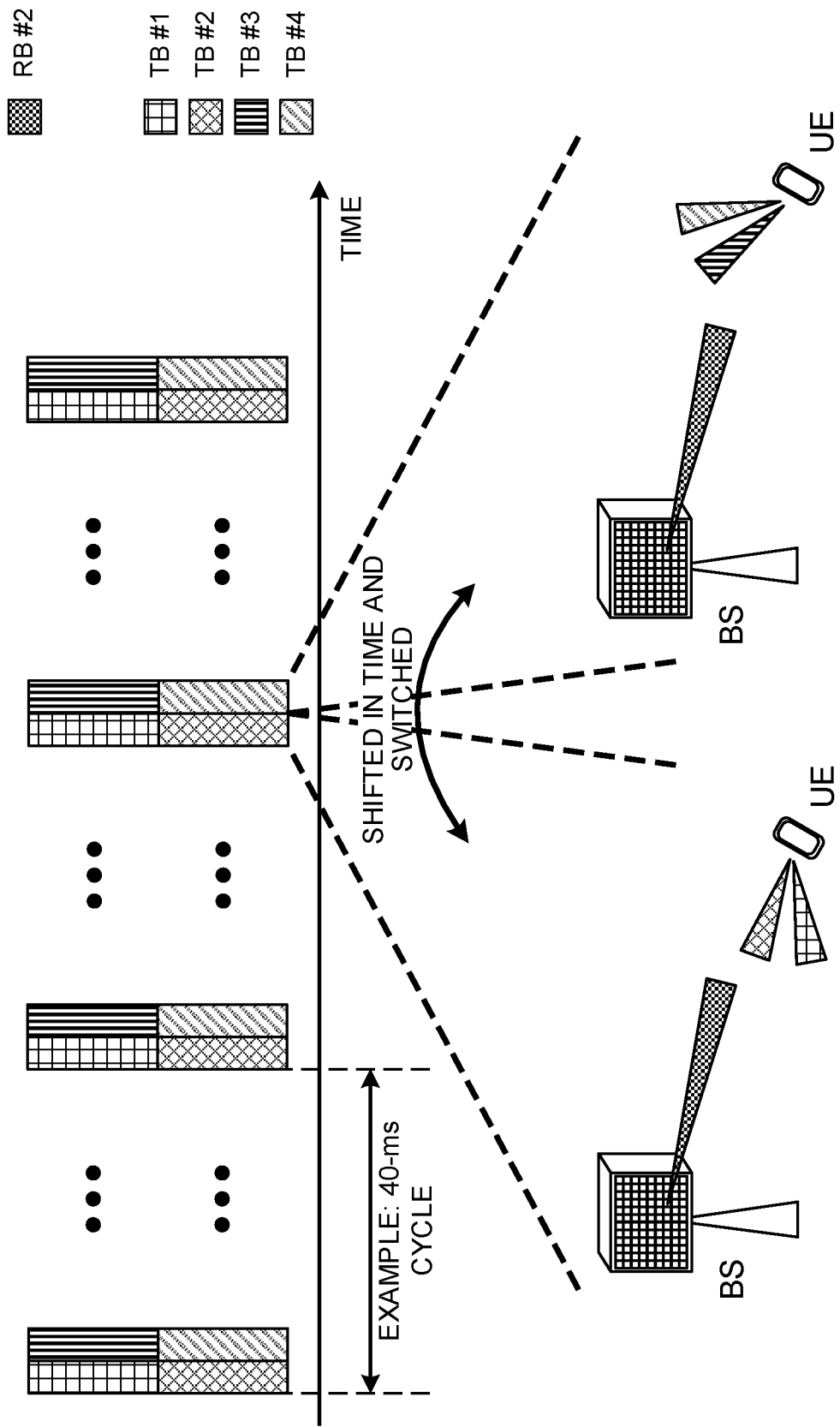
FIG. 5 is a diagram to show another example of a transmission pattern of beamforming RSs.

Also, multiple beamforming RSs may be transmitted at the same time, or the transmission timing and the transmission cycle may be configured for simultaneous transmission. FIG. 5 is a diagram to show another example of the transmission pattern for beamforming RSs. In the example shown in FIG. 5, the RSs corresponding to TB #1 and #2 are transmitted simultaneously in a predetermined cycle (which is, for example, 40 ms), and, adjoining in time, the RSs corresponding to TB #3 and TB #4 are transmitted simultaneously.

When the UE adopts digital BF, the UE can transmit multiple beamforming RSs simultaneously, in different beams, so that it is possible to reduce the overhead.

Figure 6A:
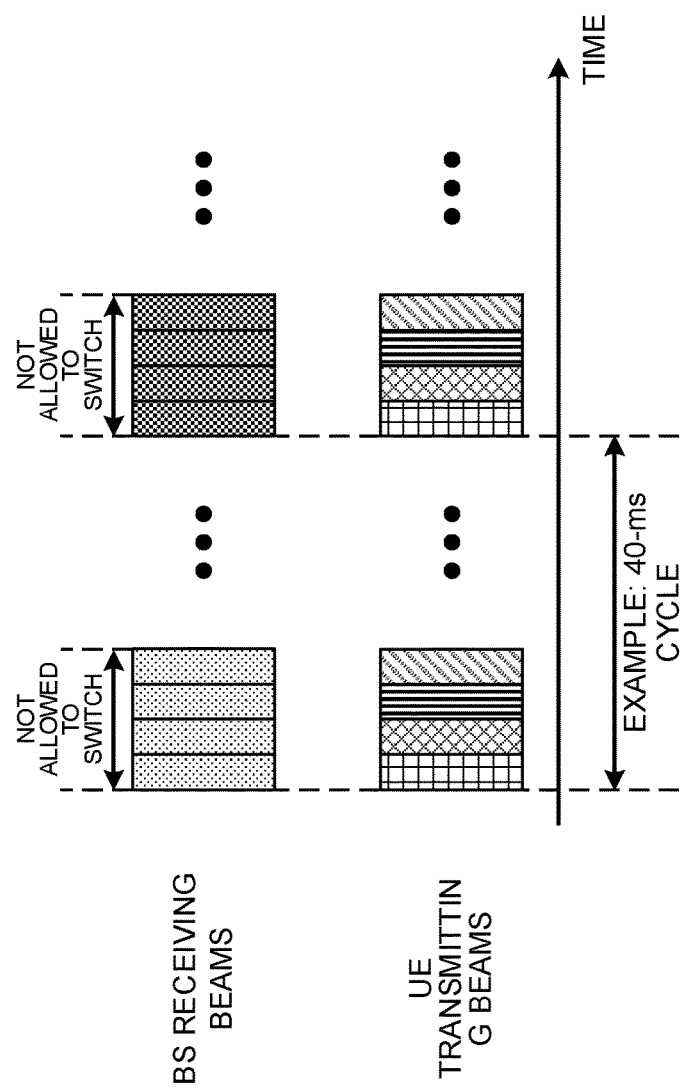
FIGS. 6A and 6B are diagrams to explain the problems and solutions when a UE scans transmitting beams.

FIG. 6 provide diagrams to explain the problems and solutions in the event the UE scans transmitting beams. As shown in FIG. 6A, when both the transmitting beams at the UE and the receiving beams at the BS are swept simultaneously, it may occur that the transmitting beams and the receiving beams always point in different directions. In this case, the BS cannot measure the received quality, and therefore cannot judge which UE transmitting beams are adequate.

Figure 6B:
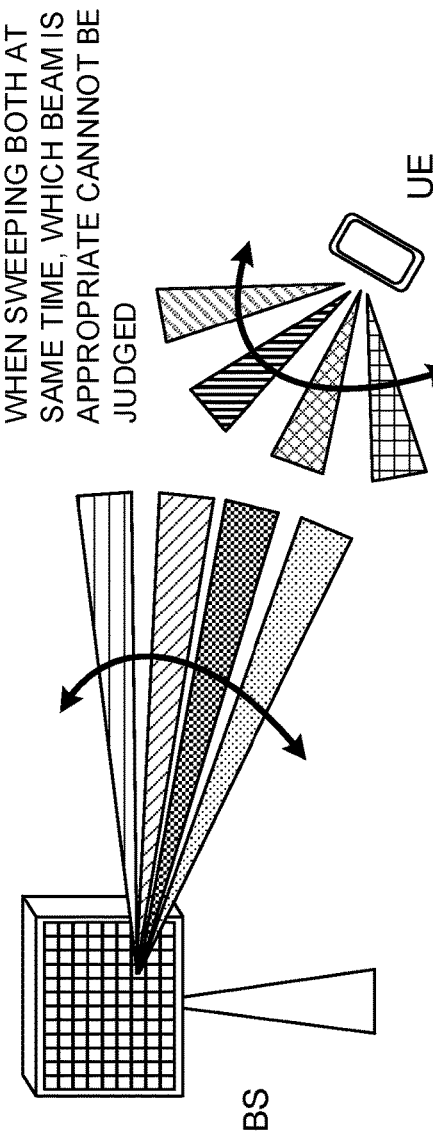

Therefore, as shown in FIG. 6B, it is preferable that the BS does not switch its receiving beam while measuring the beamforming RSs. That is, the BS measures different transmission beamforming RSs in the same receiving beam. The BS may switch to another receiving beam and make measurements in the next cycle.

<Receiving-Beam Scanning in BS>

Figure 7A:
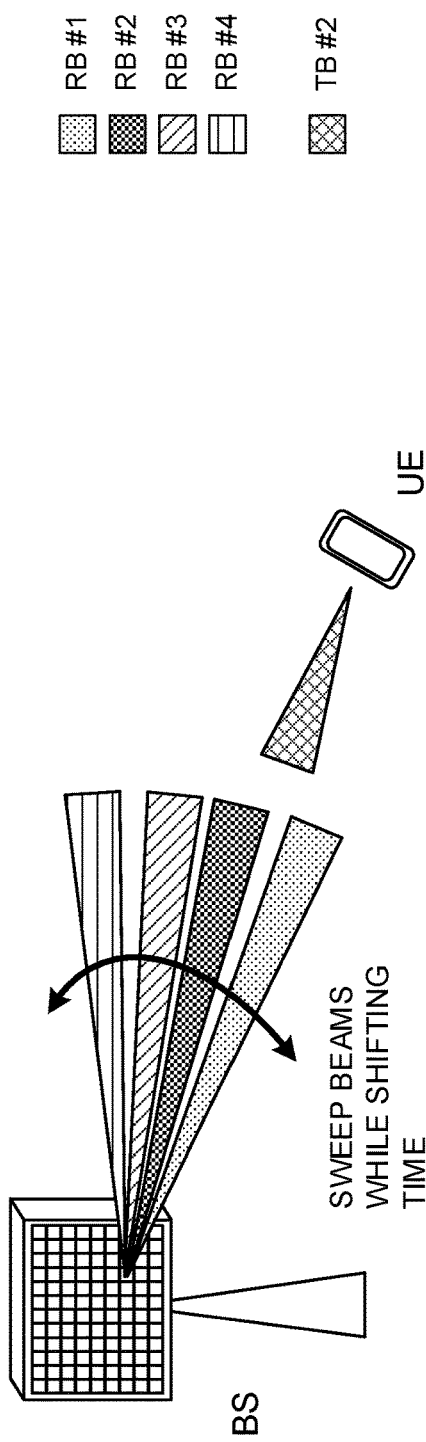
FIGS. 7A and 7B are diagrams to explain the concept of receiving-beam scanning when beamforming RSs are used.
Figure 7B:
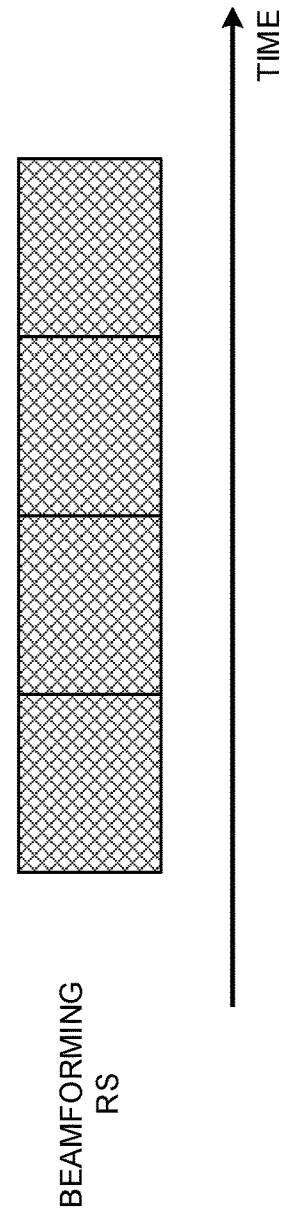

FIG. 7 provide diagrams to explain the concept of receiving-beam scanning when beamforming RSs are used. In the example shown in FIG. 7A, an attempt to receive a predetermined beamforming RS from a UE is made in multiple receiving beams. FIG. 7B shows an example of time resources for a beamforming RS, in accordance with FIG.

7A. In FIG. 7, in a predetermined period, the UE applies the same transmission beamforming to beamforming RSs provided at different points in time.

FIG. 7 show an example in which a BS sweeps receiving beams RB #1 to RB #4 by shifting the time. The BS measures the received quality using each beamforming RS.

In addition, the BS determines adequate receiving beams based on the measured received quality of each beamforming RS, and controls subsequent communication with the UE.

Figure 8A:
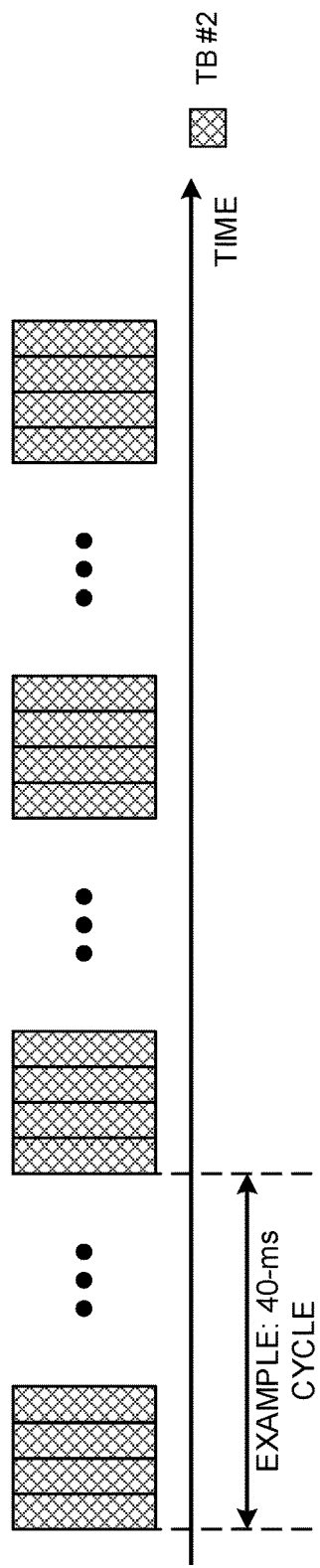
FIGS. 8A and 8B are diagrams to show examples of transmission patterns of beamforming RSs.
Figure 8B:
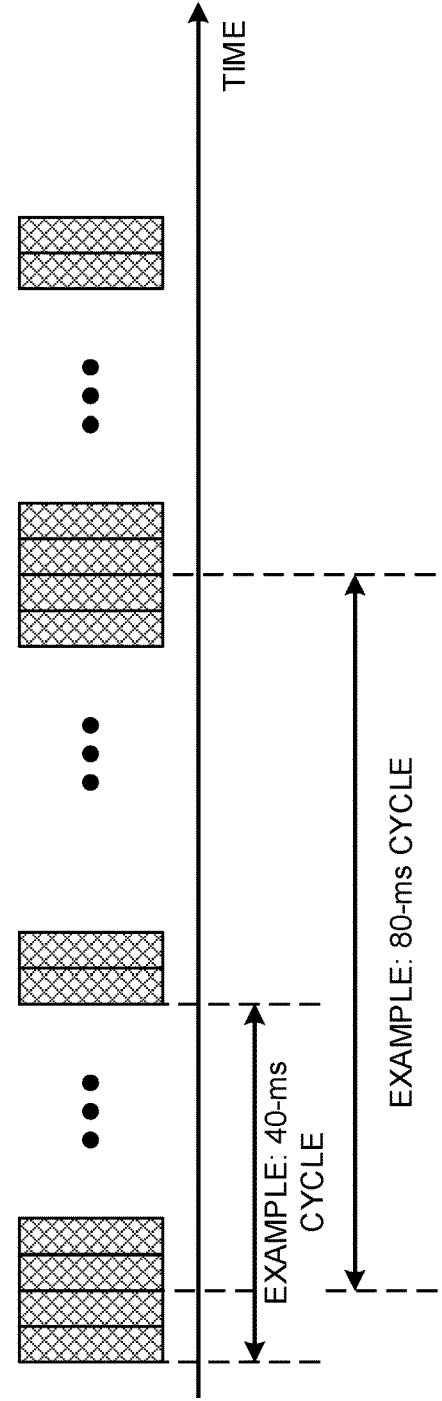

The configuration and format of beamforming RSs are as described above in connection with transmitting-beam scanning. FIG. 8 show examples. FIG. 8 provide diagrams to show examples of transmission patterns of beamforming RSs. FIG. 8 are the same as the examples of FIG. 4, except that a fixed beamforming RS is used.

FIG. 9 provide diagrams to explain the problems and solutions when a BS scans receiving beams. As shown in FIG. 9A, when a UE's transmitting beams and a BS's receiving beams are swept at the same time, there is a possibility that it is not possible to judge which UE transmitting beams are adequate, as has been described earlier with reference to FIG. 6A.

Therefore, as shown in FIG. 9B, the UE, preferably, does not switch the transmitting beam while the BS measures the beamforming RSs. That is, the BS measures the same transmission beamforming RS in different receiving beams. The UE may switch to another transmitting beam and transmit the beamforming RS in this transmitting beam in the next cycle.

<Suitable Beam Scanning in UE and BS>

The transmitting beam scanning in a UE and the receiving-beam scanning in a BS have been separately discussed above. The present inventors, based upon these discussions, have found out a method for efficiently scanning both the transmitting beams at a UE and the receiving beams at a BS, and identifying adequate beams.

To be more specific, in a first period set, in which a beamforming RS is transmitted in a plurality of different transmitting beams, a BS forms a single receiving beam and measures this RS. In other words, in the first period set in which the BS forms a single receiving beam, the UE switches and forms a plurality of different transmitting beams, and transmit a beamforming RS in each beam. Measurement results pertaining to the first period set can be used effectively to select the UE's transmitting beams.

Also, in a second period set, in which a beamforming RS is transmitted via a single transmitting beam, the BS switches and forms a plurality of different receiving beams, and measures this RS. In other words, in the second period set in which the BS switches around a plurality of different receiving beams, the UE forms a single transmitting beam and transmits a beamforming RS. Measurement results pertaining to the second period set can be used effectively to select the BS's receiving beams.

Here, each period set may consist of continuous time resources or discrete time resources. A period set may be referred to as a "time resource set," a "sub frame set," a "symbol set," and so on.

FIG. 10 provide diagrams to show examples of adequate beam scanning in a UE and a BS. FIG. 10A shows an example of a case where a UE sweeps beams and a BS uses a fixed beam in every transmission cycle of a beamforming RS. FIG. 10B shows an example of a case where the UE uses a fixed beam and the BS sweeps beams in every transmission cycle of a beamforming RS.

Referring to FIG. 10A, looking at a certain period within a given transmission cycle, the UE transmits varying beamforming RSs while switching the transmitting beams. On the other hand, during this period, the BS measures different beamforming RSs in the same receiving beam.

In this case, the first period set is equivalent to the duration of beamforming RS transmission in each cycle (for example, the continuous period of time in which TB #1 to TB #4 are formed in FIG. 10A), and the second period set is equivalent to a set of times in which the same beamforming RS is transmitted in multiple cycles (for example, a set of a plurality of times in FIG. 10A where TB #1 is formed).

That is, the UE transmits varying beamforming RSs (different transmitting beams) in every cycle, so that the measurement results of these RSs are useful when making selections among the transmitting beams of the UE. In addition, the BS measures the same beamforming RS, using different receiving beams, at relatively the same timing within each cycle, so that the measurement results of these RSs are useful when making selections among the receiving beams of the BS.

Also, referring to FIG. 10B, the UE transmits the same transmitting beam (the same beamforming RS) in a predetermined period in a given transmission cycle. Meanwhile, during this period, the BS switches the receiving beams and measures the same beamforming RS.

In this case, the first period set is equivalent to a set of relatively the same time in multiple cycles (for example, a set of a plurality of times in which RB #1 is formed in FIG. 10A), and the second period set is equivalent to the duration of beamforming RS transmission in each cycle (for example, the continuous period of time in which RB #1 to RB #4 are formed in FIG. 10A).

That is, the UE transmits different beamforming RSs (different transmitting beams) at relatively the same timing in each cycle, so that the measurement results of these RSs are useful when making selections among the transmitting beams of the UE. Also, the BS measures the same beamforming RS using different receiving beams in each cycle, so that the measurement results of these RSs are useful when making selections among the receiving beams of the BS.

Therefore, according to the beam scanning illustrated in FIGS. 10, the beams of the UE and the BS can be scanned in a short time.

Note that the receiving beams of the BS have only to be determined and used by the BS, and the UE does not even have to know which receiving beams the BS uses. On the other hand, as for the UE's transmitting beams, which beams are adequate needs to be reported to the UE. Consequently, when the same beamforming RS is measured in different receiving beams, there is no need to report appropriate transmitting beams in relationship to every one of multiple receiving beams, and it suffices to report information that can identify all or part of the transmission beamforming RSs showing good received quality—that is, information that can identify transmitting beams where good received quality is measured.

Therefore, the BS may transmit (all or part of) information related to beams, corresponding to the results measured based on different beamforming RSs, as information related to the UE transmitting beams. Here, the information about the UE transmitting beams that are subject to feedback may be information about the transmitting beams corresponding to one or a combination of the following measurement results (received quality): (1) a predetermined number (for example, n) of measurement results that are selected in descending order of measurement results of beamforming RSs; (2) measurement results that are equal to or above a predetermined threshold value; and (3) the highest measurement result. Note that the number of measurement results and the predetermined threshold described above, used to determine the target for feedback, may be configured by RRC signaling, for example.

According to the embodiment described above, both the UE and the BS can form appropriate transmitting/receiving beams based on beamforming RSs transmitted in the uplink.

<Time Resources in which Beamforming RSs are Transmitted>

Figure 11:
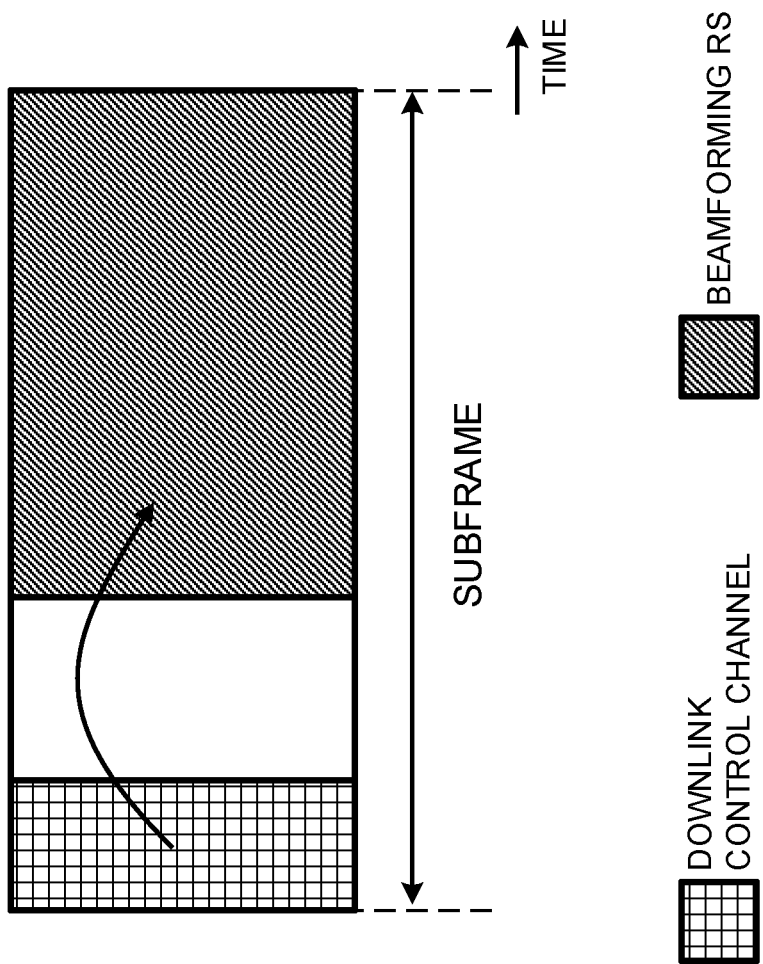
FIG. 11 is a diagram to show an example of transmitting beamforming RSs in predetermined subframes.

Time resources for transmitting beamforming RSs will be described below with reference to FIG. 11 and FIG. 12. FIG. 11 is a diagram to show an example in which a beamforming RS is transmitted in fixed DL subframes. In FIG. 11, the UE obtains the scheduling information pertaining to the beamforming RS (information related to the beamforming RS) from the downlink control information (DCI) contained in an arbitrary downlink control channel (which is, for example, the PDCCH (Physical Downlink Control Channel)). The beamforming RS is transmitted in radio resources specified by this DCI. For example, the beamforming RS may be transmitted in the same subframe as the subframe in which the DCI is received, or in a different subframe.

Note that the BS may be configured to transmit DCI, measure a beamforming RS, and transmit information related to a transmitting beam that is selected based on the measurement results, all within the same subframe.

FIG. 12 provide diagrams to show examples of transmission time durations of beamforming RSs (the time duration of UE transmitting beams). FIG. 12 show examples of time resources for beamforming RSs, which are swept by the UE, as in FIG. 3B. Note that the scale on the horizontal axis changes in each of FIGS. 12A to 12C.

As shown in FIG. 12A, different beamforming RSs (transmitting beams of the UE) may be transmitted in a plurality of subframes. Also, as shown in FIG. 12B, different beamforming RSs may be transmitted in different symbols within the same subframe. Furthermore, as shown in FIG. 12C, it is possible to divide the transmission time period in the same symbol in one subframe into a plurality of periods, and transmit a different beamforming RS in each divided period.

Note that it is preferable to configure the duration of subframes (transmission time intervals (TTIs)) shorter than the subframe duration in existing LTE (that is, "short TTIs"), and for example, it is possible to configure the subframe duration 0.1 ms to 0.25 ms. The subframe duration is by no means limited to this.

Note that the symbol period may be, for example, represented in OFDM (Orthogonal Frequency Division Multiplexing)/SC-FDMA (Single Carrier Frequency Division Multiple Access) symbol units, represented in reciprocal units of a predetermined bandwidth (that is, the sampling duration), or represented in other units of measurement.

Also, as shown in FIG. 7B, even when the UE transmits a beamforming RS using a fixed transmitting beam in a given period, various transmission time durations can be used as in FIG. 12. Also, the unit time for the BS to form receiving beams may be a subframe, a symbol, part of a symbol, and so on, like the transmission time duration of beamforming RSs.

(Variations)

Note that a beamforming RS may be a CSI measurement RS (for example, an uplink measurement reference signal (UL-SRS: Uplink Sounding Reference Signal)), or an RS that is separately defined.

The UE may transmit information about the number of analog beams the UE can form (information from which the number of analog beams can be specified), to the network side (for example, the BS) in advance as its terminal capability information (UE capability). This capability information can be the number of analog beams, a desirable number of times the BS repeats transmitting a beamforming RS in a predetermined beam, the number of phase shifters mounted, and so on.

When receiving the above capability information from the UE, the BS can determine the format of beamforming RSs for the UE, report information as to which beamforming RSs the UE should transmit, schedule beamforming RSs and report the scheduling information to the UE, and so on. Furthermore, the BS may control the UE that has transmitted the above capability information to perform beam scanning in accordance with the above-described radio communication method.

When the UE has functions that are compatible with carrier aggregation (CA), which uses a plurality of component carriers (CC), dual connectivity (DC) and so on, the UE can report the above information as per-UE information, which is common in all CCs. Provided that a beam that is formed based on RF is the same in other CCs, and therefore can be handled as the same beam in all CCs. Note that this may be the same in the case of supporting CA and DC in the future (CA and DC in 5 G).

The UE may report information about the number of downlink analog beams (receiving beams) which the UE can form, and information about the number of uplink analog beams (transmitting beams) which the UE can form, as separate pieces of capability information. This allows the BS side to learn, more accurately, which terminal BF is feasible in the uplink and in the downlink, and to configure beamforming RSs more adequately.

Also, after receiving and measuring a beamforming RS, the BS may include information related to transmitting beams (information as to which transmitting were adequate), in a part of DCI, and transmit this in a downlink control channel (DL-CCH), include this information in a part of RRC information and transmit this in a downlink shared channel (DL-SCH), or include and transmit this information in the MAC control elements (MAC CEs: Medium Access Control Control Elements).

When the UE receives the report, the UE may assume that the same beam control must be applied until a beam-change report (information related to transmitting beams) is received next. Meanwhile, even when the UE receives the report, when triggered at the start of handover, the start of random access procedures, the expiration of the TAT (Time Alignment Timer), which is used for uplink timing synchronization, and so on, the UE can make transmission using beams (for example, the default beam, the beam with the smallest beam index value, etc.) other than the beams specified by the information related to transmitting beams.

(Radio Communication System)

Now, the structure of the radio communication system according to one embodiment of the present invention will be described below. In this radio communication system, communication is performed using one or a combination of the radio communication methods according to the herein-contained embodiments of the present invention.

Figure 13:
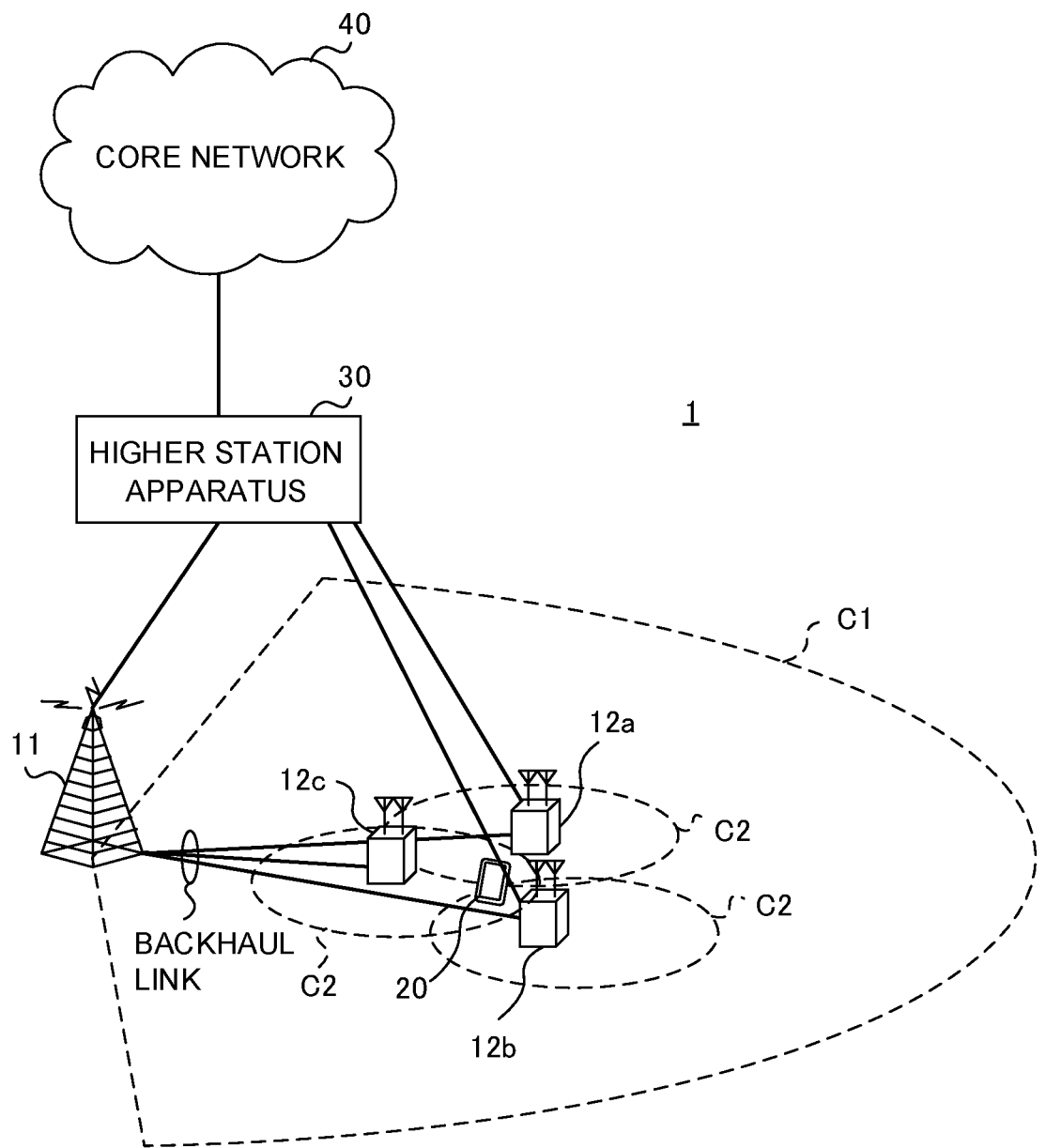
FIG. 13 is a diagram to show an example of a schematic structure of a radio communication system according to one embodiment of the present invention.

FIG. 13 is a diagram to show an example of a schematic structure of a radio communication system according to one embodiment of the present invention. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "FRA (Future Radio Access)," "New-RAT (Radio Access Technology)" and so on, or may be seen as a system to implement these.

The radio communication system 1 shown in FIG. 13 includes a radio base station 11 that forms a macro cell C1, which has a relatively wide coverage, and radio base stations 12 (12a to 12c) that form small cells C2, which are placed within the macro cell C1 and which are narrower than the macro cell C1. Also, user terminals 20 are placed in the macro cell C1 and in each small cell C2.

The user terminals 20 can connect with both the radio base station 11 and the radio base stations 12. The user terminals 20 may use the macro cell C1 and the small cells C2 at the same time by means of CA or DC. Furthermore, the user terminals 20 may apply CA or DC using a plurality of cells (CCs) (for example, five or fewer CCs or six or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB" (eNodeB), a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) is applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to these combinations, and other radio access schemes may be used.

In the radio communication system 1, a downlink shared channel (PDSCH: Physical Downlink Shared CHannel), which is used by each user terminal 20 on a shared basis, a broadcast channel (PBCH: Physical Broadcast CHannel), downlink L1/L2 control channels and so on are used as downlink channels. User data, higher layer control information and SIBs (System Information Blocks) are communicated in the PDSCH. Also, the MIB (Master Information Block) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. HARQ (Hybrid Automatic Repeat reQuest) delivery acknowledgment information (also referred to as, for example, "retransmission control information," "HARQ-ACK," "ACK/NACK," etc.) in response to the PUSCH is transmitted by the PHICH. The EPDCCH is frequency-division-multiplexed with the PDSCH (downlink shared data channel) and used to communicate DCI and so on, like the PDCCH.

In the radio communication system 1, an uplink shared channel (PUSCH: Physical Uplink Shared CHannel), which is used by each user terminal 20 on a shared basis, an uplink control channel (PUCCH: Physical Uplink Control CHannel), a random access channel (PRACH: Physical Random Access CHannel) and so on are used as uplink channels. User data and higher layer control information are communicated by the PUSCH. Also, downlink radio quality information (CQI: Channel Quality Indicator), delivery acknowledgement information and so on are communicated by the PUCCH. By means of the PRACH, random access preambles for establishing connections with cells are communicated.

In the radio communication systems 1, cell-specific reference signals (CRSs), channel state information reference signals (CSI-RSs), demodulation reference signals (DMRSs), positioning reference signals (PRSs) and so on are communicated as downlink reference signals. Also, in the radio communication system 1, measurement reference signals (SRSs: Sounding Reference Signals), demodulation reference signals (DMRSs) and so on are communicated as uplink reference signals. Note that the DMRS may be referred to as a "user terminal-specific reference signal (UE-specific Reference Signal)." Also, the reference signals to be communicated are by no means limited to these.

(Radio Base Station)

Figure 14:
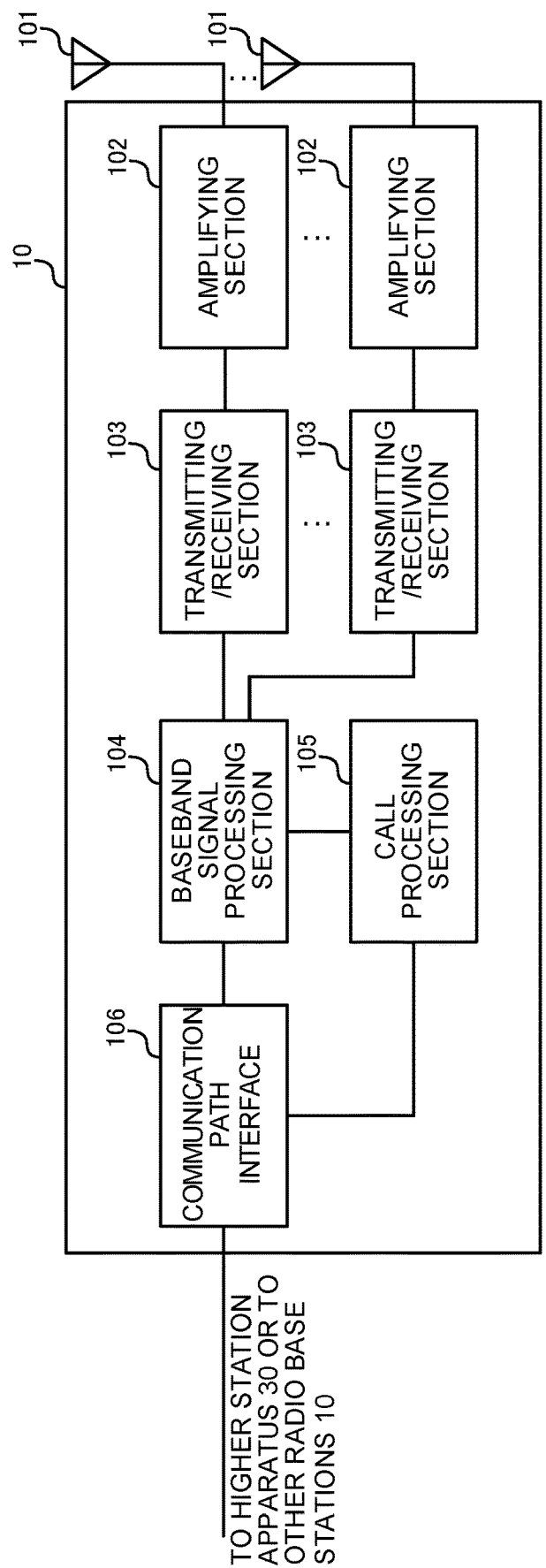
FIG. 14 is a diagram to show an example of an overall structure of a radio base station according to one embodiment of the present invention.

FIG. 14 is a diagram to show an example of an overall structure of a radio base station according to one embodiment of the present invention. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

Note that the transmitting/receiving sections 103 may furthermore have an analog beamforming section that forms analog beams. The analog beamforming section may be constituted by an analog beamforming circuit (for example, a phase shifter, a phase shifting circuit, etc.) or analog beamforming apparatus (for example, a phase shifting device) that can be described based on general understanding of the technical field to which the present invention pertains. Furthermore, the transmitting/receiving antennas 101 may be constituted by, for example, array antennas.

The transmitting/receiving sections 103 may transmit, to the user terminal 20, information related to the beamforming RSs to be transmitted.

The transmitting/receiving sections 103 receive beamforming RSs from the user terminal 20 by using receiving beams. Furthermore, the transmitting/receiving sections 103 may receive terminal capability information, which indicates the number of analog beams that the user terminal 20 can form, from the user terminal 20.

Figure 15:
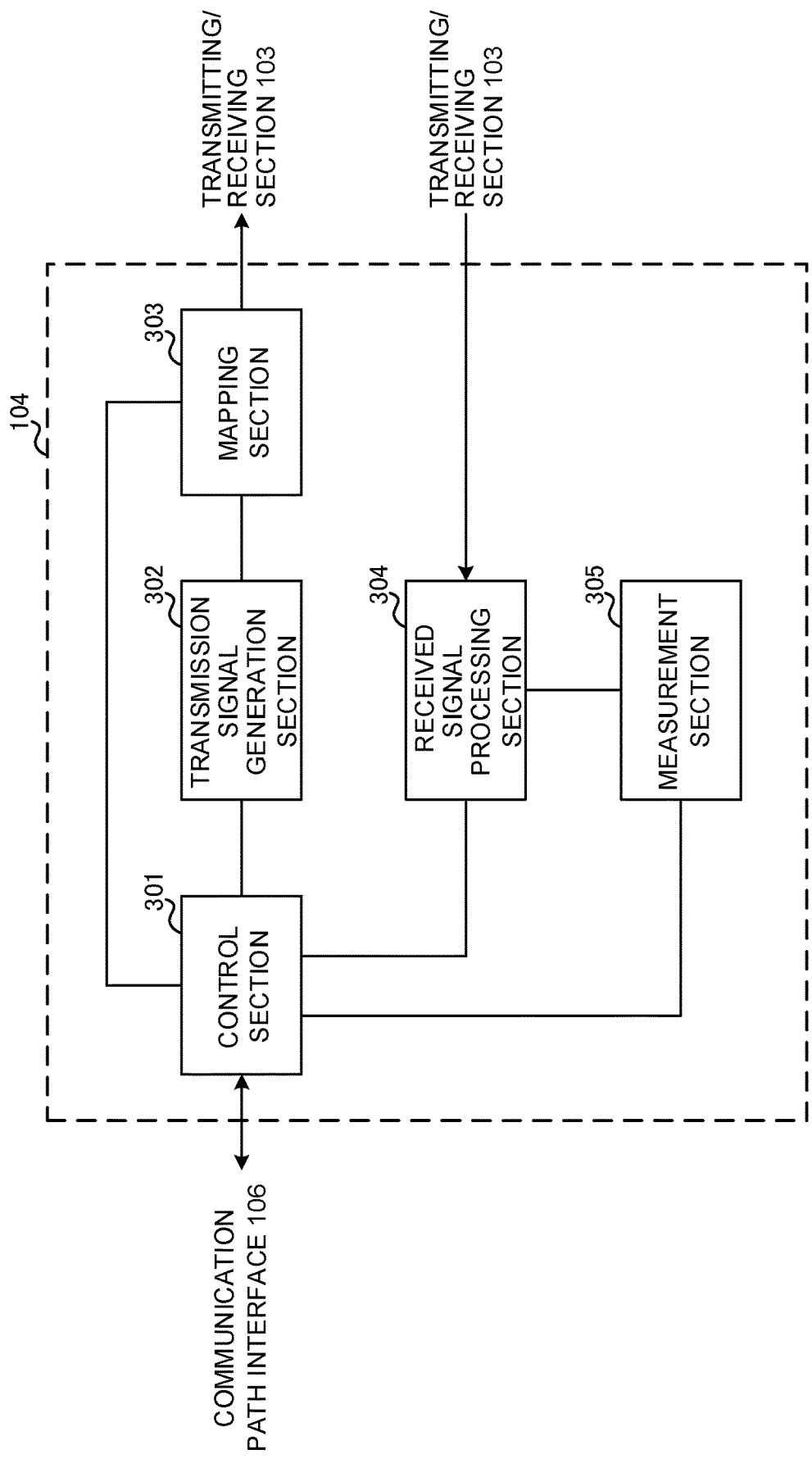
FIG. 15 is a diagram to show an example of a functional structure of a radio base station according to one embodiment of the present invention.

FIG. 15 is a diagram to show an example of a functional structure of a radio base station according to one embodiment of the present invention. Note that, although FIG. 15 primarily shows functional blocks that pertain to characteristic parts of the present embodiment, the radio base station 10 has other functional blocks that are necessary for radio communication as well.

The baseband signal processing section 104 has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104.

The control section (scheduler) 301 controls the whole of the radio base station 10. The control section 301 can be constituted by a controller, a control circuit or control apparatus that can be described based on general understanding of the technical field to which the present invention pertains.

The control section 301, for example, controls the generation of signals in the transmission signal generation section 302, the allocation of signals by the mapping section 303, and so on. Furthermore, the control section 301 controls the signal receiving processes in the received signal processing section 304, the measurements of signals in the measurement section 305, and so on.

The control section 301 controls the scheduling (for example, resource allocation) of downlink data signals that are transmitted in the PDSCH and downlink control signals that are communicated in the PDCCH and/or the EPDCCH. The control section 301 controls the generation of downlink control signals (for example, delivery acknowledgement information and so on) and downlink data signals, based on the results of deciding whether or not retransmission control is necessary for uplink data signals, and so on. Also, the control section 301 controls the scheduling of downlink reference signals such as synchronization signals (for example, the PSS (Primary Synchronization Signal)/SSS (Secondary Synchronization Signal)), the CRS, the CSI-RS, the DM-RS and so on.

In addition, the control section 301 controls the scheduling of uplink data signals that are transmitted in the PUSCH, uplink control signals that are transmitted in the PUCCH and/or the PUSCH (for example, delivery acknowledgment information), random access preambles that are transmitted in the PRACH, uplink reference signals, and so on.

The control section 301 may exert control so that transmitting beams and/or receiving beams are formed using the digital BF (for example, precoding) by the baseband signal processing section 104 and/or the analog BF (for example, phase rotation) by the transmitting/receiving sections 103.

For example, using temporally orthogonal radio resources, the control section 401 may control the forming of receiving beams so that at least one of the beamforming RSs, which are transmitted in different transmitting beams, can be received in a predetermined period set.

To be more specific, the control section 301 may exert control so that a single receiving beam is formed in a first period set, in which a beamforming RS is transmitted in varying transmitting beams from the user terminal 20. Also, the control section 301 may exert control so that a plurality of different receiving beams are switched and formed in a second period set, in which a beamforming RS is transmitted in a single transmitting beam from the user terminal 20. The control section 301 may implement both of these controls.

In addition, the control section 301 exerts control so that information about the beamforming RSs to be measured and/or reported, which is used to control the forming of transmitting beams and/or receiving beams, is generate and reported to a given user terminal 20. This information related to beamforming RSs is generated so that at least one beamforming RS can be received in a receiving beam formed by the radio base station 10 in a predetermined period set.

For example, the beamforming RS-related information, the control section 301 may include information that may be used to form a single (the same) receiving beam in the first period set. In this beamforming RS-related information, the control section 301 may include information that may be used to switch and form a plurality of different receiving beams in the second period set.

Furthermore, the control section 301 may control the transmission of beamforming RSs for the predetermined user terminal 20 based on the terminal capability information, which indicates the number of analog beams that can be formed, and which is acquired from the received signal processing section 304.

The control section 301 exert control so that the transmitting beams to be used in the user terminal 20 are determined based on the measurement results pertaining to each receiving beam, acquired from the measurement section 305, and information that can specify these determined transmitting beams is transmitted to the user terminal 20. Furthermore, the control section 301 ex exert control so that, based on the above measurement results, the transmitting beams and/or the receiving beams for the user terminal 20 are determined and used for communication with the user terminal 20.

The transmission signal generation section 302 generates downlink signals (downlink control signals, downlink data signals, downlink reference signals and so on) based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

For example, the transmission signal generation section 302 generates DL assignments, which report downlink signal allocation information, and UL grants, which report uplink signal allocation information, based on commands from the control section 301. Also, the downlink data signals are subjected to the coding process, the modulation process and so on, by using coding rates and modulation schemes that are determined based on, for example, channel state information (CSI) from each user terminal 20.

The mapping section 303 maps the downlink signals generated in the transmission signal generation section 302 to predetermined radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminals 20 (uplink control signals, uplink data signals, uplink reference signals, etc.). For the received signal processing section 304, a signal processor, a signal processing circuit or signal processing apparatus that can be described based on general understanding of the technical field to which the present invention pertains can be used.

The received signal processing section 304 outputs the decoded information acquired through the receiving processes to the control section 301. For example, when a PUCCH to contain an HARQ-ACK is received, the received signal processing section 304 outputs this HARQ-ACK to the control section 301. Also, the received signal processing section 304 outputs the received signals, the signals after the receiving processes and so on, to the measurement section 305.

The measurement section 305 conducts measurements with respect to the received signals. For example, the measurement section 305 performs measurements using the beamforming RSs transmitted from user terminal 20. The measurement section 305 can be constituted by a measurer, a measurement circuit or measurement apparatus that can be described based on general understanding of the technical field to which the present invention pertains.

When signals are received, the measurement section 305 may measure, for example, the received power (for example, RSRP (Reference Signal Received Power)), the received quality (for example, RSRQ (Reference Signal Received Quality)), SINR (Signal to Interference plus Noise Ratio) and/or the like), channel states and so on. The measurement results may be output to the control section 301.

(User Terminal)

Figure 16:
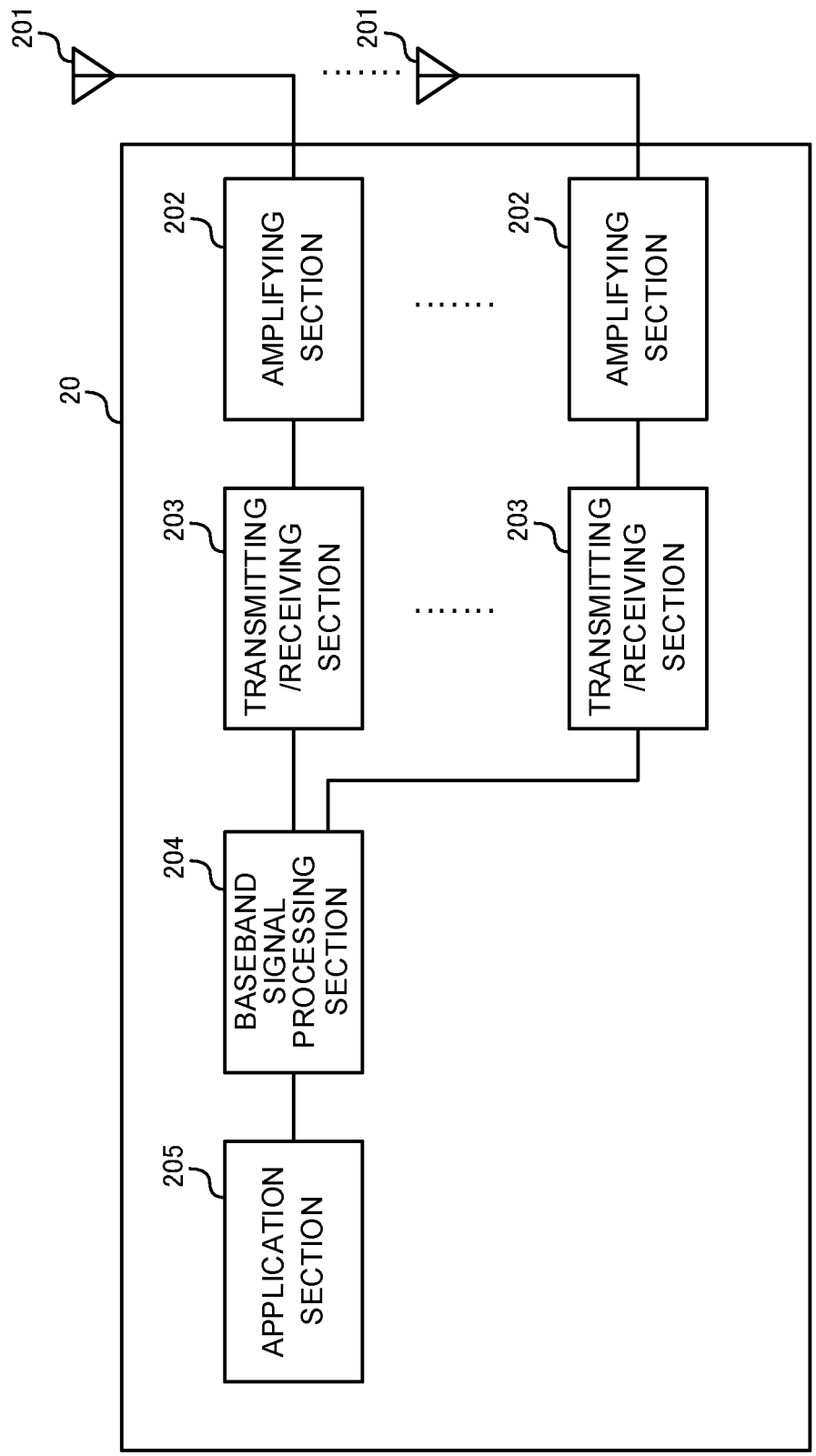
FIG. 16 is a diagram to show an example of an overall structure of a user terminal according to one embodiment of the present invention.

FIG. 16 is a diagram to show an example of an overall structure of a user terminal according to one embodiment of the present invention. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

In the baseband signal processing section 204, the baseband signal that is input is subjected to an FFT process, error correction decoding, a retransmission control receiving process, and so on. Downlink user data is forwarded to the application section 205. The application section 205 performs processes related to higher layers above the physical layer and the MAC layer, and so on. Furthermore, in the downlink data, broadcast information is also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving section 203. Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

Note that the transmitting/receiving sections 203 may furthermore have an analog beamforming section that forms analog beams. The analog beamforming section may be constituted by an analog beamforming circuit (for example, a phase shifter, a phase shifting circuit, etc.) or analog beamforming apparatus (for example, a phase shifting device) that can be described based on general understanding of the technical field to which the present invention pertains. Furthermore, the transmitting/receiving antennas 201 may be constituted by, for example, array antennas.

The transmitting/receiving section 203 may receive information about the beamforming RSs to be transmitted, from the radio base station 10.

Using transmitting beams, the transmitting/receiving sections 203 transmit beamforming RSs to the radio base station 10. In addition, the transmitting/receiving sections 203 may transmit, to the radio base station 10, terminal capability information, which indicates the number of analog beams that can be formed.

Figure 17:
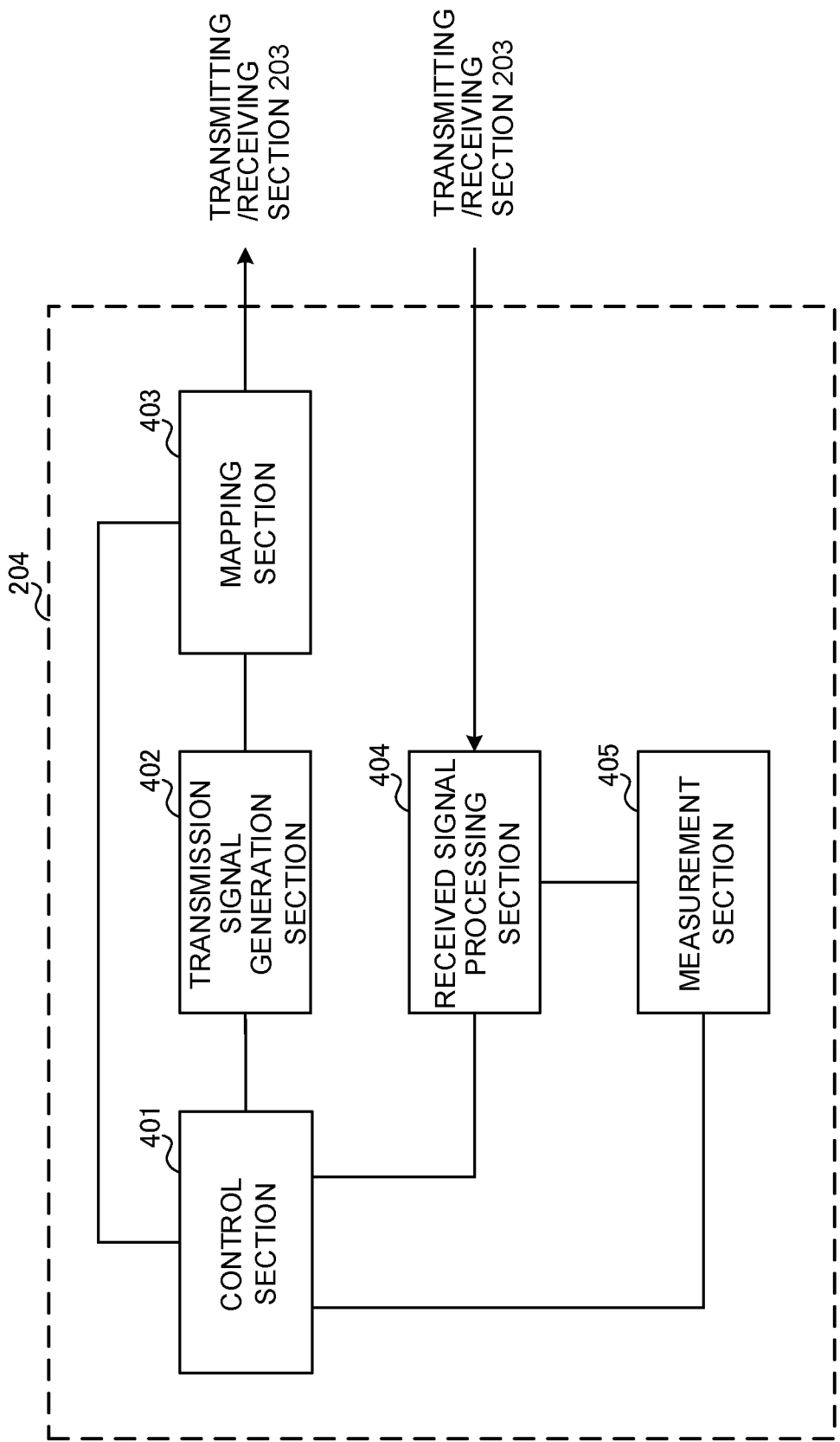
FIG. 17 is a diagram to show an example of a functional structure of a user terminal according to one embodiment of the present invention.

FIG. 17 is a diagram to show an example of a functional structure of a user terminal according to one embodiment of the present invention. Note that, although FIG. 17 primarily shows functional blocks that pertain to characteristic parts of the present embodiment, the user terminal 20 has other functional blocks that are necessary for radio communication as well.

The baseband signal processing section 204 provided in the user terminal 20 at least has a control section 401, a transmission signal generation section 402, a mapping section 403, a received signal processing section 404 and a measurement section 405. Note that these configurations have only to be included in the user terminal 20, and some or all of these configurations may not be included in the baseband signal processing section 204.

The control section 401 controls the whole of the user terminal 20. For the control section 401, a controller, a control circuit or control apparatus that can be described based on general understanding of the technical field to which the present invention pertains can be used.

The control section 401, for example, controls the generation of signals in the transmission signal generation section 402, the allocation of signals by the mapping section 403, and so on. Furthermore, the control section 401 controls the signal receiving processes in the received signal processing section 404, the measurements of signals in the measurement section 405, and so on.

The control section 401 acquires the downlink control signals (signals transmitted in the PDCCH/EPDCCH) and downlink data signals (signals transmitted in the PDSCH) transmitted from the radio base station 10, via the received signal processing section 404. The control section 401 controls the generation of uplink control signals (for example, delivery acknowledgement information and so on) and/or uplink data signals based on the results of deciding whether or not retransmission control is necessary for the downlink control signals and/or downlink data signals, and so on.

The control section 401 may exert control so that transmitting beams and/or receiving beams are formed using the digital BF (for example, precoding) by the baseband signal processing section 204 and/or the analog BF (for example, phase rotation) by the transmitting/receiving sections 203.

Here, the control section 401 may exert control so that transmitting beams and/or receiving beams are formed based on information about the beamforming RSs to be transmitted, which is acquired from the received signal processing section 404. For example, based on this information related to beamforming RSs, the control section 401 may exert control so that, using temporally orthogonal radio resources, different transmitting beams are formed to transmit different beamforming RSs. To be more specific, the control section 401 controls the forming of transmitting beams so that at least one beamforming RS is received via a receiving beam which the radio base station 10 forms in a predetermined period set.

To be more specific, in a first period set, in which the radio base station 10 forms a single receiving beam, the control section 401 may exert control so that a beamforming RS is transmitted in a plurality of different transmitting beams. Also, in a second period set, the control section 401 may exert control so that a beam forming RS is transmitted in a single (the same) transmitting beam. The control section 401 may implement both of these controls.

In addition, the control section 401 may exert control so that terminal capability information, which indicates the number of analog beams that can be formed, is transmitted to the radio base station 10.

Furthermore, when various kinds of information reported from the radio base station 10 are acquired via the received signal processing section 404, the control section 401 may update the parameters to use in control based on these pieces of information.

The transmission signal generation section 402 generates uplink signals (uplink control signals, uplink data signals, uplink reference signals and so on) based on commands from the control section 401, and outputs these signals to the mapping section 403. The transmission signal generation section 402 can be constituted by a signal generator, a signal generating circuit or signal generating apparatus that can be described based on general understanding of the technical field to which the present invention pertains.

For example, the transmission signal generation section 402 generates uplink control signals related to delivery acknowledgement information, channel state information (CSI) and so on, based on commands from the control section 401. Also, the transmission signal generation section 402 generates uplink data signals based on commands from the control section 401. For example, when a UL grant is included in a downlink control signal that is reported from the radio base station 10, the control section 401 commands the transmission signal generation section 402 to generate an uplink data signal.

The mapping section 403 maps the uplink signals generated in the transmission signal generation section 402 to radio resources based on commands from the control section 401, and outputs the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The received signal processing section 404 outputs the decoded information, acquired through the receiving processes, to the control section 401. The received signal processing section 404 outputs, for example, broadcast information, system information, RRC signaling, DCI and so on, to the control section 401. Also, the received signal processing section 404 outputs the received signals, the signals after the receiving processes and so on, to the measurement section 405.

The measurement section 405 conducts measurements with respect to the received signals. The measurement section 405 can be constituted by a measurer, a measurement circuit or measurement apparatus that can be described based on general understanding of the technical field to which the present invention pertains.

The measurement section 405 may measure, for example, the received power (for example, RSRP), the received quality (for example, RSRQ, received SINR), the channel states and so on of the received signals. The measurement results may be output to the control section 401.

(Hardware Structure)

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be implemented with one piece of physically-integrated apparatus, or may be implemented by connecting two physically-separate pieces of apparatus via radio or wire and by using these multiple pieces of apparatus.

Figure 18:
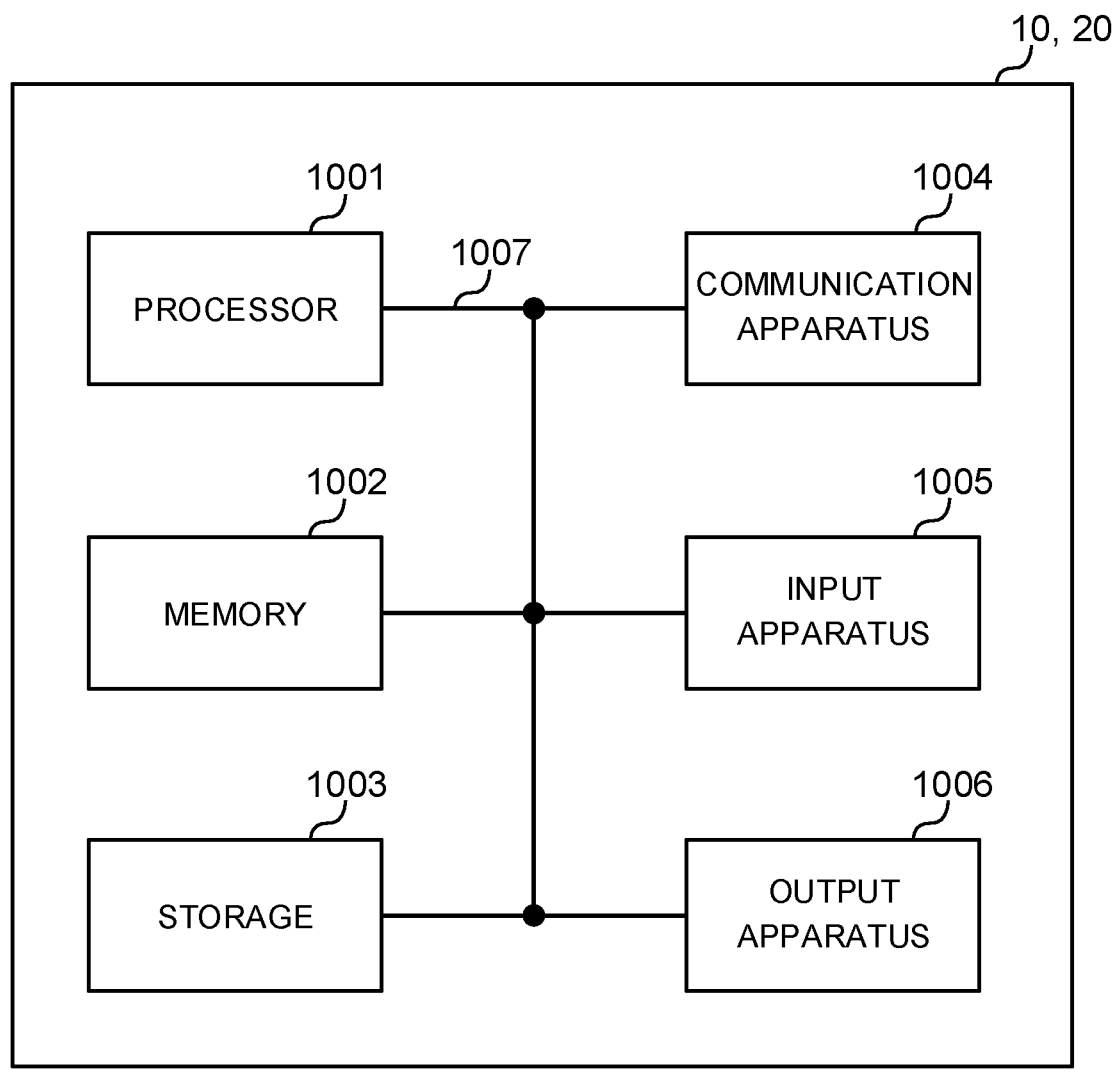
FIG. 18 is a diagram to show an example of a hardware structure of a radio base station and a user terminal according to one embodiment of the present invention.

For example, the radio base station, user terminals and so on according to embodiments of the present invention may function as a computer that executes the processes of the radio communication method of the present invention. FIG. 18 is a diagram to show an example hardware structure of a radio base station and a user terminal according to one embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

Each function of the radio base station 10 and the user terminal 20 is implemented by reading predetermined software (program) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory" (primary storage apparatus) and so on. The memory 1002 can store executable programs (program codes), software modules and/or the like for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, etc.). The output apparatus 1006 is an output device for sending output to the outside (for example, a display, a speaker, etc.). Note that the input apparatus 1005 and the output apparatus 1006 may be provided in an integrated structure (for example, a touch panel).

Furthermore, these types of apparatus, including the processor 1001, the memory 1002 and others, are connected by a bus 1007 for communicating information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

Note that the terminology used in this specification and the terminology that is needed to understand this specification may be replaced by other terms that convey the same or similar meanings. For example, "channels" and/or "symbols" may be replaced by "signals (or signaling)." Also, "signals" may be "messages." Furthermore, a "component carrier" (CC) may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe."

Furthermore, a subframe may be comprised of one or more slots in the time domain. Furthermore, a slot may be comprised of 1 or multiple symbols (OFDM symbols, SC-FDMA symbols, etc.) in the time domain.

A radio frame, a subframe, a slot and a symbol all represent the time unit in signal communication. A radio frames, a subframe, a slot and a symbol may be each called by other applicable names. For example, one subframe may be referred to as a "transmission time interval" (TTI), or a plurality of consecutive subframes may be referred to as a "TTI," or one slot may be referred to as a "TTI." That is, a subframe and a TTI may be a subframe (one ms) in existing LTE, may be a shorter period than one ms (for example, one to thirteen symbols), or may be a longer period of time than one ms.

Here, a TTI refers to the minimum time unit of scheduling in radio communication, for example. For example, in LTE systems, a radio base station schedules the allocation of radio resources (such as the frequency bandwidth and transmission power that can be used by each user terminal) for each user terminal in TTI units. Note that the definition of TTIs is not limited to this. TTIs may be the time unit for transmitting channel-encoded data packets (transport blocks), or may be the unit of processing in scheduling, link adaptation and so on.

A TTI having a time duration of one ms may be referred to as a "normal TTI" (TTI in LTE Rel. 8 to 12), a "long TTI," a "normal subframe," a "long subframe," and so on. A TTI that is shorter than a normal TTI may be referred to as a "shortened TTI," a "short TTI," a "shortened subframe," a "short subframe," or the like.

A resource block (RB) is the unit of resource allocation in the time domain and the frequency domain, and may include one or a plurality of consecutive subcarriers in the frequency domain. Also, an RB may include one or more symbols in the time domain, and may be one slot, one subframe or one TTI in length. One TTI and one subframe each may be comprised of one or more resource blocks. Note that an RB may be referred to as a "physical resource block" (PRB: Physical RB), a "PRB pair," an "RB pair," or the like.

Furthermore, a resource block may be comprised of one or more resource elements (REs). For example, one RE may be a radio resource field of one subcarrier and one symbol.

Note that the above-described structures of radio frames, subframes, slots, symbols and so on are merely examples. For example, configurations such as the number of subframes included in a radio frame, the number of slots included in a subframe, the number of symbols and RBs included in a slot, the number of subcarriers included in an RB, the number of symbols in a TTI, the symbol duration, the cyclic prefix (CP) duration and so on can be variously changed.

Also, the information and parameters described in this specification may be represented in absolute values or in relative values with respect to predetermined values, or may be represented in other information formats. For example, radio resources may be specified by predetermined indices.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation and microwaves), these wired technologies and/or wireless technologies are also included in the definition of communication media.

The terms "system" and "network" as used herein are used interchangeably.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs: Remote Radio Heads)). The term "cell" or "sector" refers to part or all of the coverage area of a base station and/or a base station subsystem that provides communication services within this coverage.

As used herein, the terms "base station (BS)," "radio base station," "eNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D: Device-to-Device). In this case, user terminals 20 may have the functions of the radio base stations 10 described above. In addition, wording such as "uplink" and "downlink" may be interpreted as "side."

For example, an uplink channel may be interpreted as a side channel.

Likewise, the user terminals in this specification may be interpreted as radio base stations. In this case, the radio base stations 10 may have the functions of the user terminals 20 described above.

The examples/embodiments illustrated in this specification may be used individually or in combinations, which may be switched depending on the mode of implementation. Also, predetermined information (for example, reporting of information to the effect that "X holds") does not necessarily have to be reported explicitly, and can be reported in an implicit manner (by, for example, not reporting this piece of information).

Reporting of information is by no means limited to the examples/embodiments described in this specification, and other methods may be used as well. For example, reporting of information may be implemented by using physical layer signaling (for example, DCI (Downlink Control Information) and UCI (Uplink Control Information)), higher layer signaling (for example, RRC (Radio Resource Control) signaling, broadcast information (the MIB (Master Information Blocks) and SIBs (System Information Blocks) and so on) and MAC (Medium Access Control) signaling, other signals or combinations of these.

Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

The aspects/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), GSM (Global System for Mobile communications) (registered trademark), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate systems and/or next-generation systems that are enhanced based on these.

The order of processes, sequences, flowcharts and so on that have been used to describe the examples/embodiments herein may be re-ordered as long as inconsistencies do not arise. For example, although various methods have been illustrated in this specification with various components of steps in exemplary orders, the specific orders that are illustrated herein are by no means limiting.

Now, although the present invention has been described in detail above, it should be obvious to a person skilled in the art that the present invention is by no means limited to the embodiments described herein. For example, the above-described embodiments may be used individually or in combinations. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The disclosure of Japanese Patent Application No. 2016-061784, filed on Mar. 25, 2016, including the specification, drawings and abstract, is incorporated herein by reference in its entirety.

The invention claimed is:

1. A terminal comprising:
   a receiver that receives configuration information regarding a plurality of sounding reference signal (SRS) resources by higher layer signaling, the plurality of SRS resources corresponding respectively to beams; and
   a transmitter that transmits a plurality of SRSs based on the configuration information, the plurality of SRSs corresponding respectively to the SRS resources,
   wherein the transmitter transmits the plurality of SRSs at mutually different time instants.

2. The terminal according to claim 1, wherein the transmitter transmits each of the plurality of SRSs periodically.

3. The terminal according to claim 2, wherein the transmitter transmits a first SRS based on the configuration information and a second SRS based on second configuration information simultaneously.

4. The terminal according to claim 1, wherein the transmitter transmits capability information that indicates a number of formable beams.

5. A base station comprising:
   a transmitter that transmits configuration information regarding a plurality of sounding reference signal (SRS) resources by higher layer signaling, the plurality of SRS resources corresponding respectively to beams; and
   a receiver that receives a plurality of SRSs based on the configuration information, the plurality of SRSs corresponding respectively to the SRS resources, wherein the receiver receives the plurality of SRSs at mutually different time instants.

6. A radio communication method for a terminal, comprising:

receiving configuration information regarding a plurality of sounding reference signal (SRS) resources by higher layer signaling, the plurality of SRS resources corresponding respectively to beams; and transmitting a plurality of SRSs based on the configuration information, the plurality of SRSs corresponding respectively to the SRS resources, wherein the terminal is configured to transmit the plurality of SRSs at mutually different time instants.

* * * * *